United States Patent

Okada et al.

[11] Patent Number: 5,838,668
[45] Date of Patent: Nov. 17, 1998

[54] SATELLITE BROADCAST COMMUNICATIONS SYSTEM

[75] Inventors: Kazuhiro Okada; Hideki Hieida; Koichiro Takeda, all of Kawasaki, Japan

[73] Assignee: Fujitsu Limited, Kanagawa, Japan

[21] Appl. No.: 622,701

[22] Filed: Mar. 26, 1996

[30] Foreign Application Priority Data

Jun. 13, 1995 [JP] Japan .................................... 7-146063

[51] Int. Cl.$^6$ ........................................................ H04J 3/24
[52] U.S. Cl. ........................ 370/312; 370/349; 370/316; 455/12.1
[58] Field of Search .................................... 370/310, 312, 370/486, 487, 313, 314, 321, 322, 326, 337, 347, 325, 316, 349; 455/3.1, 3.2, 12.1; 348/6, 7, 906

[56] References Cited

U.S. PATENT DOCUMENTS

| 4,837,786 | 6/1989 | Gurantz et al. | 370/206 |
| 5,345,594 | 9/1994 | Tsuda | 455/18 |
| 5,430,738 | 7/1995 | Tsuda | 371/37 |
| 5,619,274 | 4/1997 | Roop et al. | 348/461 |

FOREIGN PATENT DOCUMENTS 5-797248  6/1982  Japan .............................. H04L 1/00

Primary Examiner—Hassan Kizou
Assistant Examiner—A. Bnimoussa
Attorney, Agent, or Firm—Helfgott & Karas, P.C.

[57] ABSTRACT

A satellite broadcast communications system, in which a host station sends packet-multiplexed signals to a plurality of terminal stations via a communications satellite, specifically improving efficiency in data retransmission operations without sacrificing the channel capacity of the satellite communications link. Broadcast schedule transmission means transmits the broadcast schedule, which contains the title and transmission time of each transmission data, to every terminal station via the communications satellite. Based on the broadcast schedule, composite information transmission means broadcasts various data to the terminal stations. Broadcast schedule reception means receives the broadcast schedule, and based on the received broadcast schedule, desired information reception means selectively receives desired information at the scheduled transmission time. Further, vacant time slot detection means examines the broadcast schedule to find vacant time slots in which no transmission is scheduled, and broadcast schedule production means rearranges the broadcast schedule so that the data once transmitted be retransmitted in those vacant time slots.

18 Claims, 33 Drawing Sheets

| | JAN. | FEB. | MAR. | --- | NOV. | DEC. |
|---|---|---|---|---|---|---|
| R1 | | | | | | |
| R2 | | | | | | |
| REGION ⋮ | | | | | | |
| Rn | | | | | | |

FIG. 11

SATELLITE BROADCAST COMMUNICATIONS SYSTEM

BACKGROUND OF THE INVENTION

1. Field of the Invention

The present invention relates to a satellite broadcast communications system, and more specifically, to a satellite broadcast communications system in which a host station sends packet message signals to a plurality of terminal stations via a communications satellite.

2. Description of the Related Art

In a packet-multiplexed satellite communications system, a sending earth station transmits data to a satellite in a plurality of fixed-length data blocks, or packets, each having information as a header to identify the destination address, etc. Satellite transponders receive the packet signals from each sending earth station and retransmit them to receiving earth stations in a broadcast mode. Every earth station monitors all those signals and extracts relevant messages addressed thereto, checking the headers contained in the received packets. Therefore, it would be possible for the sending station to broadcast the same packets to several receiving stations by specifying a plurality of destination addresses in the packets.

Such a sending station is normally configured so that it will automatically retransmit the same information to the receiving stations, allowing them to deal with some errors that may be detected in their received packets. It is required to use a retransmission protocol efficient enough for the satellite links to maintain their throughput, because the links have a large propagation delay time, about 0.3 second per one hop (i.e., a travel of signals on the up-link and down-link path via a communications satellite).

The SREJ system (equivalent to the selective repeat ARQ system) based on HDLC protocol is one of the conventional protocols that provide efficient retransmission procedures. In this system, even if a receiving station has detected an error in a certain data block, it keeps on receiving and storing valid data blocks that continue to arrive therein and replaces later the erroneous data block with the valid data block when it is retransmitted. For those operations, the receiving station has a large buffer memory and controls the received data blocks based on their sequence numbers.

FIG. 33 illustrates such data retransmission operations, where the sending station is transmitting four data blocks A, B, C, and D in the respective packets to the receiving station via the communications satellite. Following after those data blocks with some predetermined delay time, four retransmission blocks a, b, c, and d are transmitted so as to convey the contents identical to the original ones.

On the other hand, the receiving station accepts the respective data blocks, watching their arriving sequence. FIG. 33 shows that the receiving station has successfully received the blocks A and C but has failed to get the block B. In such a case, its built-in buffer storage unit requests a receiver unit to acquire the retransmission block b, while storing the valid blocks A and C. On this request, the receiver unit receives the retransmission block b and forwards it to the buffer storage unit. By inserting this retransmission block b to the position of the failed block B, the buffer storage unit reassembles the blocks A, B, and C in the correct sequence.

This conventional system, however, has some drawbacks that the sending station must transmit the retransmission blocks a, b, c, and d in addition to the original blocks A, B, C, and D, although their contents are just the same. Some worse conditions in the transmission paths may even require the above retransmission operations to be repeated many times. The total amount of transferred data will be doubled as a result of the first one retransmission, and then multiplied in proportion to the number of retransmission operations. This is indeed a serious problem that would cause difficulty in efficient utilization of a limited channel capacity of the communications satellites.

SUMMARY OF THE INVENTION

Taking the above into consideration, an object of the present invention is to provide a satellite broadcast communications system, which will improve the efficiency of data retransmission operations without sacrificing the channel capacity of the satellite communication links.

To accomplish the above object, according to the present invention, there is provided a satellite broadcast communications system in which a host station sends data packet signals to a plurality of terminal stations via a communications satellite. The system comprises the following elements.

A first element is broadcast schedule transmission means, which is disposed in the host station, for transmitting a broadcast schedule that defines at least titles and transmission times of a plurality of transmission data. A second element is composite information transmission means, also disposed in the host station, for transmitting the plurality of transmission data at the respective transmission times according to the broadcast schedule. A third element is broadcast schedule reception means, which is disposed in each of the terminal stations, for receiving the broadcast schedule. A fourth element is desired information reception means, also disposed in each of the terminal stations, for receiving desired transmission data selectively from the plurality of transmission data sent from the composite information transmission means, at the transmission time corresponding therewith based on the broadcast schedule received by the broadcast schedule reception means.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 11 is a rainfall duration table;

DESCRIPTION OF THE PREFERRED EMBODIMENTS

Embodiments of the present invention will be described below with reference to the drawings.

Figure 1:
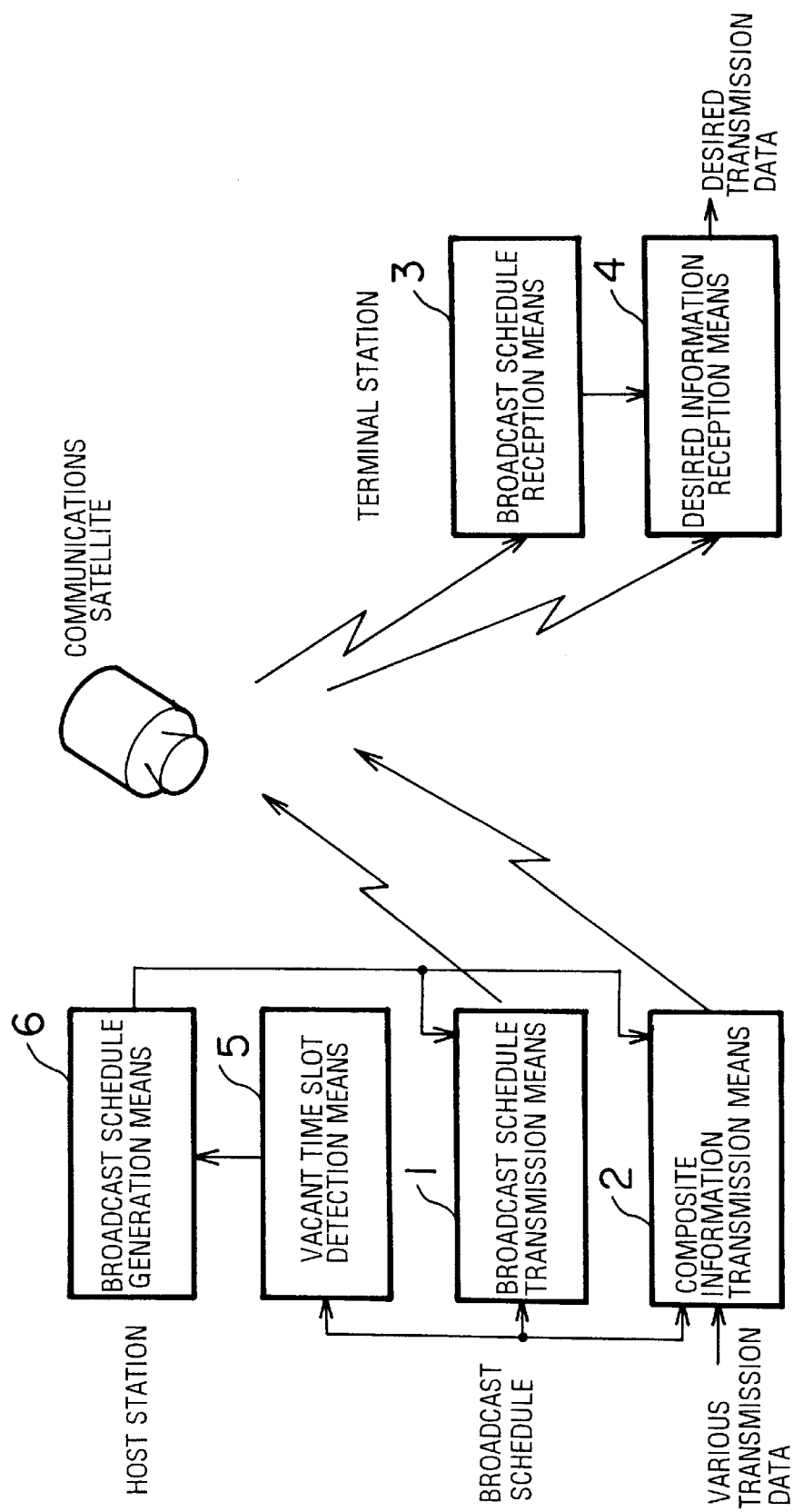
FIG. 1 is a conceptual view of the present invention.

At the outset, the basic structure of a first embodiment will be explained with reference to FIG. 1. This embodiment comprises the following four elements. A first element is broadcast schedule transmission means, which is disposed in the host station, for transmitting a broadcast schedule that defines at least titles and transmission times of a plurality of transmission data. A second element is composite information transmission means, also disposed in the host station, for transmitting the plurality of transmission data at the respective transmission times according to the broadcast schedule. A third element is broadcast schedule reception means, which is disposed in each of the terminal stations, for receiving the broadcast schedule. A fourth element is desired information reception means, also disposed in each of the terminal stations, for receiving a desired transmission data selectively from the plurality of transmission data sent from the composite information transmission means, at the transmission time corresponding therewith based on the broadcast schedule received by the broadcast schedule reception means.

Figure 2:
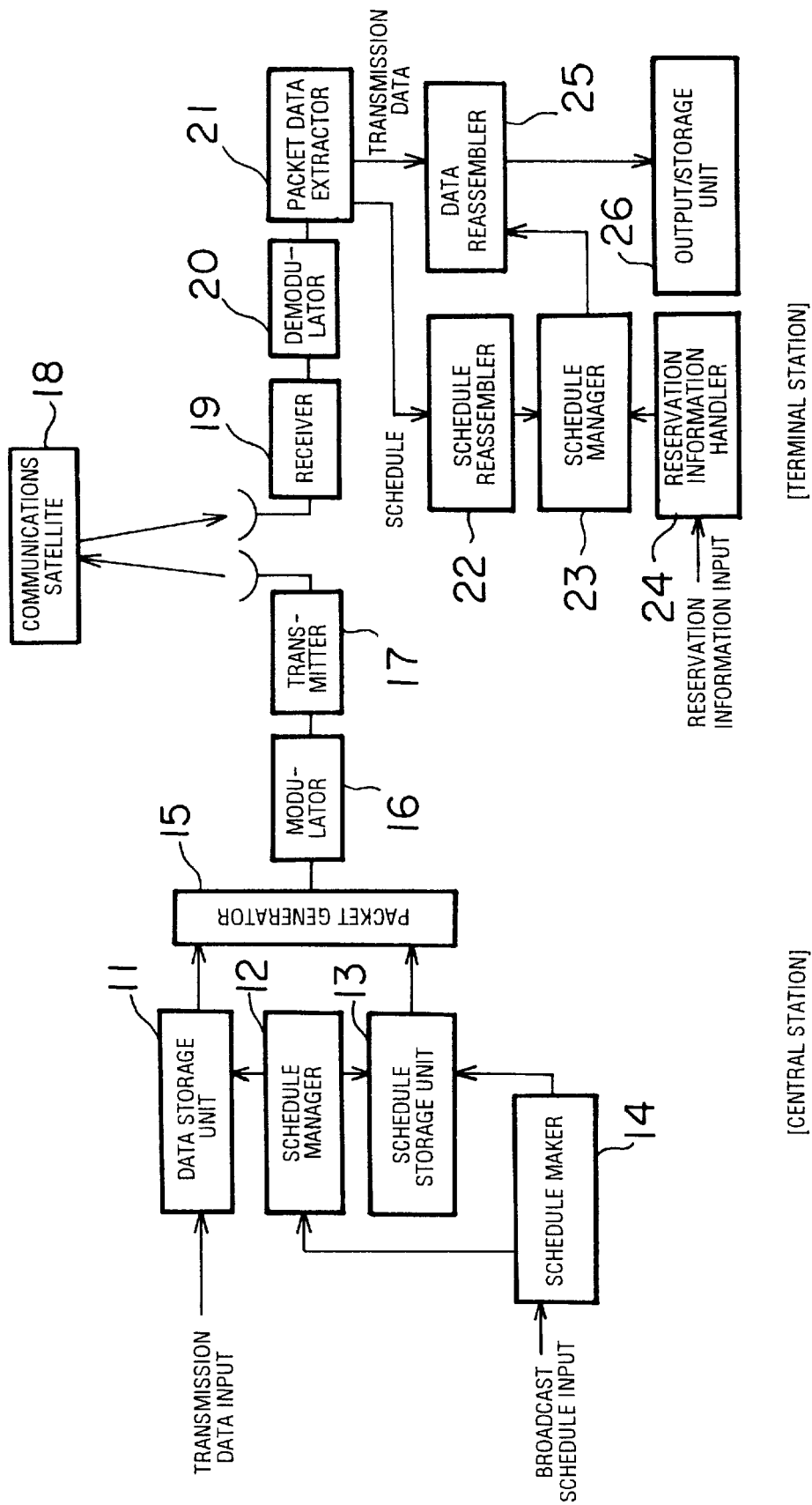
FIG. 2 is a diagram showing the structure of a first embodiment.

FIG. 2 is a block diagram showing more detailed structure of the first embodiment. The broadcast schedule transmission means 1 in FIG. 1 is implemented here as a combination of a schedule storage unit 13, a packet generator 15, a modulator 16, and a transmitter 17. Similarly, the composite information transmission means 2 corresponds to a data storage unit 11, a schedule manager 12, a packet generator 15, a modulator 16, and a transmitter 17; the broadcast schedule reception means 3 corresponds to a receiver 19, a demodulator 20, a packet data extractor 21, and a schedule reassembler 22; the desired information reception means 4 corresponds to a receiver 19, a demodulator 20, a packet data extractor 21, a data reassembler 25 and a schedule manager 23. The host station in FIG. 1 appears in FIG. 2 as a central station.

This system works as follows. While various information to be transmitted (i.e., transmission data) is first entered into the data storage unit 11, a broadcast schedule is entered from an external source to the schedule maker 14 and it is then distributed to the schedule storage unit 13 and schedule manager 12. The schedule storage unit 13 stores the received broadcast schedule.

Figure 3:
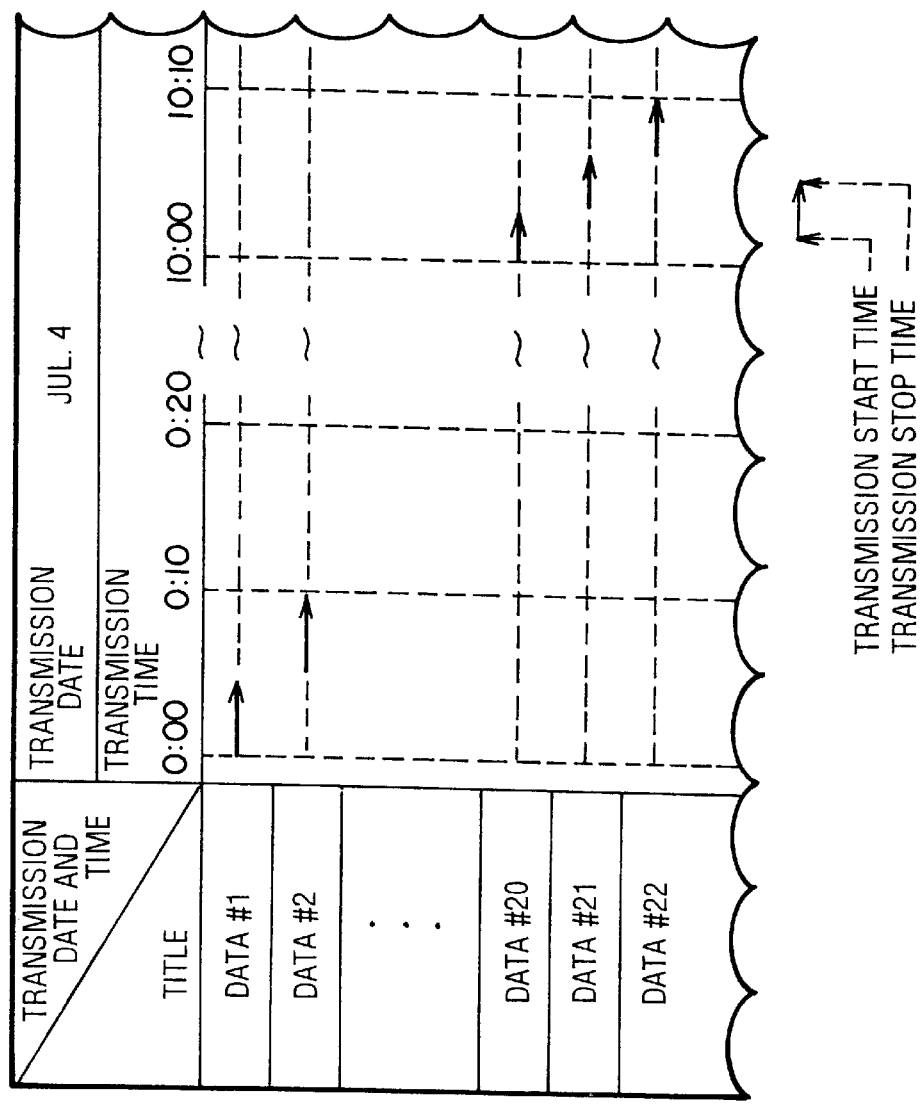
FIG. 3 is a diagram showing a broadcast schedule.

FIG. 3 shows an example of the broadcast schedule, where the central station is scheduled to transmit data #1 from 0:00 till 0:05 and then data #2 from 0:05 till 0:10.

Returning to FIG. 2, the schedule manager 12 has a clock integrated therein, and for each scheduled time, it directs the data storage unit 11 to supply the transmission data specified in the broadcast schedule to the packet generator 15. The data storage unit 11 outputs the transmission data as divided in a plurality of blocks suitable for packet assembly. The schedule manager 12 further directs the schedule storage unit 13 to supply the broadcast schedule data to the packet generator 15. In a similar way, the schedule storage unit 13 outputs the broadcast schedule data in the blocked form.

Figure 4:
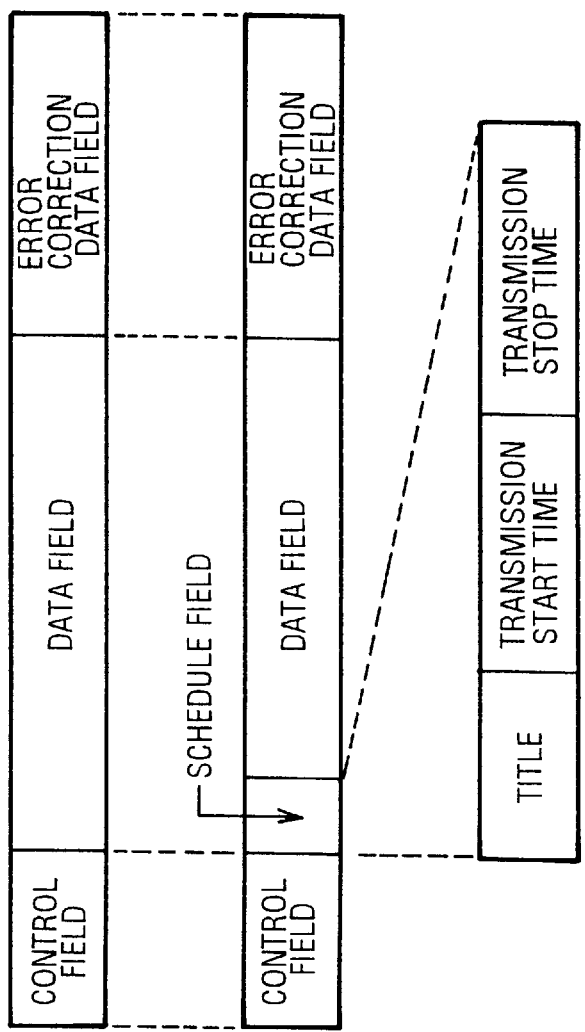
FIGS. 4(A) and 4(B) are diagrams respectively showing the structure of a packet having no specific field to convey a broadcast schedule and a packet having a dedicated field for the broadcast schedule.

The packet generator 15 assembles the packets from the given data blocks. As shown in FIG. 4(B), each packet is organized with a control field, a schedule field, a data field, and an error correction code field. The data field conveys a block of the transmission data, and the schedule field a block of the broadcast schedule data. Alternatively, the packet may be configured as shown in FIG. 4(A), where the data field is used to convey the broadcast schedule data instead of the dedicated schedule field. In this case, the packet must have an indicator in its control field to show that the data field is now used for the broadcast schedule data.

The packets assembled by the packet generator 15 are then transmitted to the communications satellite 18 via the modulator 16 and transmitter 17. The communications satellite 18 repeats the packet signals to the terminal stations. The signals that has arrived at the receiver 19 in the terminal station is supplied to the packet data extractor 21 after being detected by the demodulator 20. The packet data extractor 21 extracts pieces of the broadcast schedule data and the transmission data from the received packets and send them to the schedule reassembler 22 and the data reassembler 25, respectively, to reassemble the broadcast schedule data and transmission data in their original form before packet transmission.

The reservation information handler 24 accepts reservations from an external requester for reception of specific transmission data, and according to those reservations, it directs the schedule manager 23 to receive the reserved transmission data. The schedule manager 23 has a built-in clock, and at the right time when the reserved transmission data is expected to arrive, it requests the data reassembler 25 to output the received and reassembled data to the output/storage unit 26 during the transmission period defined in the broadcast schedule. Note here that the reception of reserved transmission data actually involves that of relevant retransmission data. The output/storage unit 26 includes a display monitor and a storage unit for data processing equipment.

As described above, each terminal station receiving the satellite signals can obtain its intended information as well as retransmission information in an efficient way based on the broadcast schedule. If it were the conventional system, the output/storage unit 26 in each terminal station should always stand ready for reception of the incoming signals because it never knew when the central station would send messages addressed thereto. In contrast to this, the output/storage unit 26 according to the present invention is only required to watch and wait during a quite limited time period, and it can execute other tasks while being free from the communications-related tasks, thus resulting in an improved utilization of the unit.

The following description will now devote to a second embodiment of the present invention, which will specifically show how to perform the data retransmission.

Figure 5:
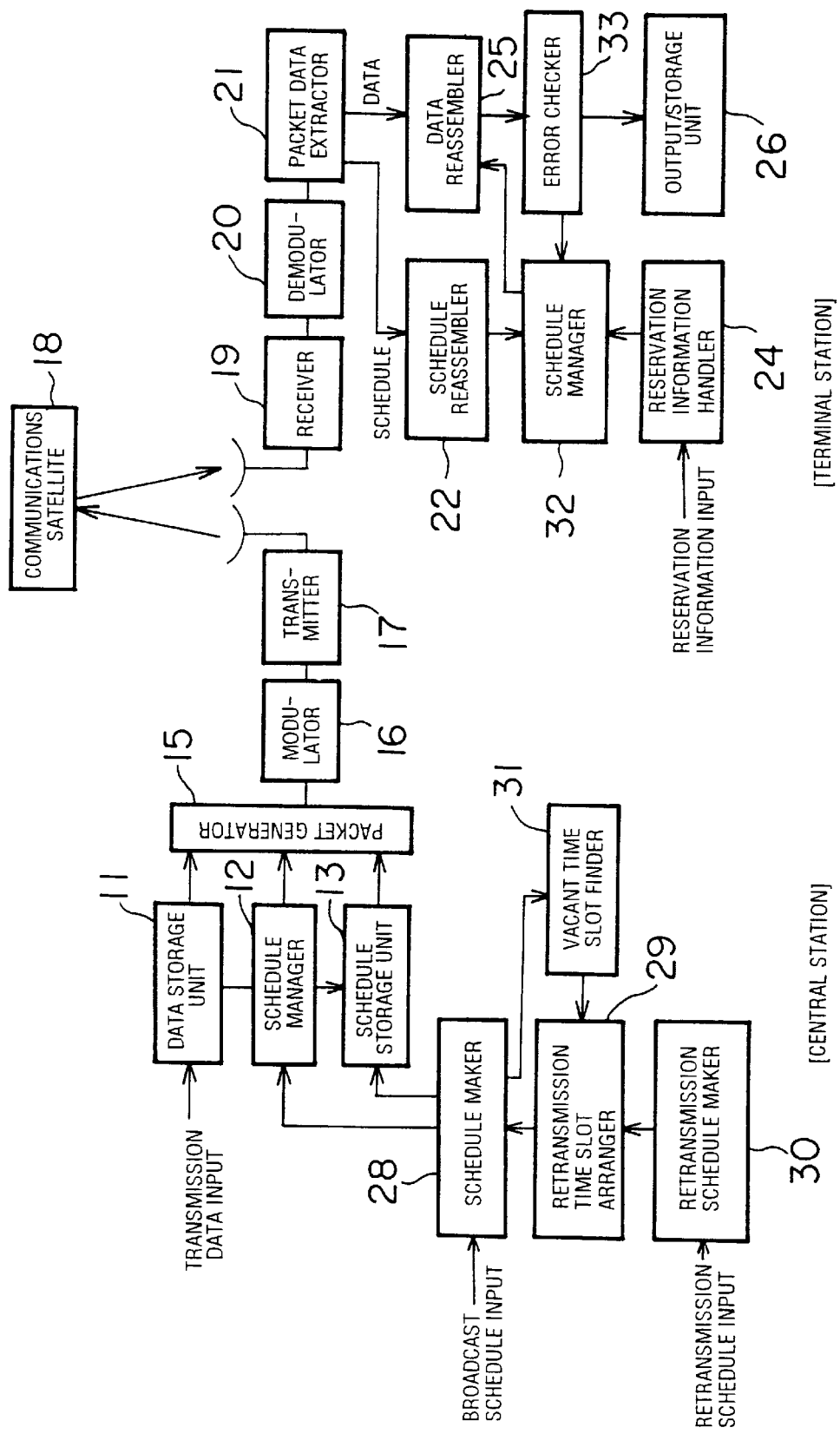
FIG. 5 is a diagram showing the structure of a second embodiment.

FIG. 5 is a block diagram showing the structure of a second embodiment. Since this embodiment has basically the same structure as that of the first embodiment, the following description will focus on its distinctive points, while maintaining the consistent reference numerals for the common elements. A vacant time slot detection means 5 in FIG. 1 corresponds to a vacant time slot finder 31 in FIG. 5, and similarly, a broadcast schedule generation means 6 corresponds to a combination of a schedule maker 28, a retransmission time slot arranger 29, and a retransmission schedule maker 30.

In the second embodiment, the schedule maker 28 distributes the broadcast schedule also to the vacant time slot finder 31. The vacant time slot finder 31 examines the broadcast schedule to find vacant time slots in which no transmission is assigned, and sends each date and time of the found vacant time slots to the retransmission time slot arranger 29. On the other hand, a retransmission schedule is entered from an external source to the retransmission schedule maker 30. This retransmission schedule input actually describes titles and priority of transmission data to be resent, i.e., retransmission data. The retransmission schedule maker 30 selects retransmission data having the highest priority order and supplies its title to the retransmission time slot arranger 29. The retransmission time slot arranger 29 then requests the schedule maker 28 to rearrange the broadcast schedule so that the selected retransmission message be sent at the earliest time among the plurality of vacant time slots that are available. According to this request, the schedule maker 28 rearranges the broadcast schedule and delivers it to the schedule manager 12 and schedule storage unit 13.

Figure 6:
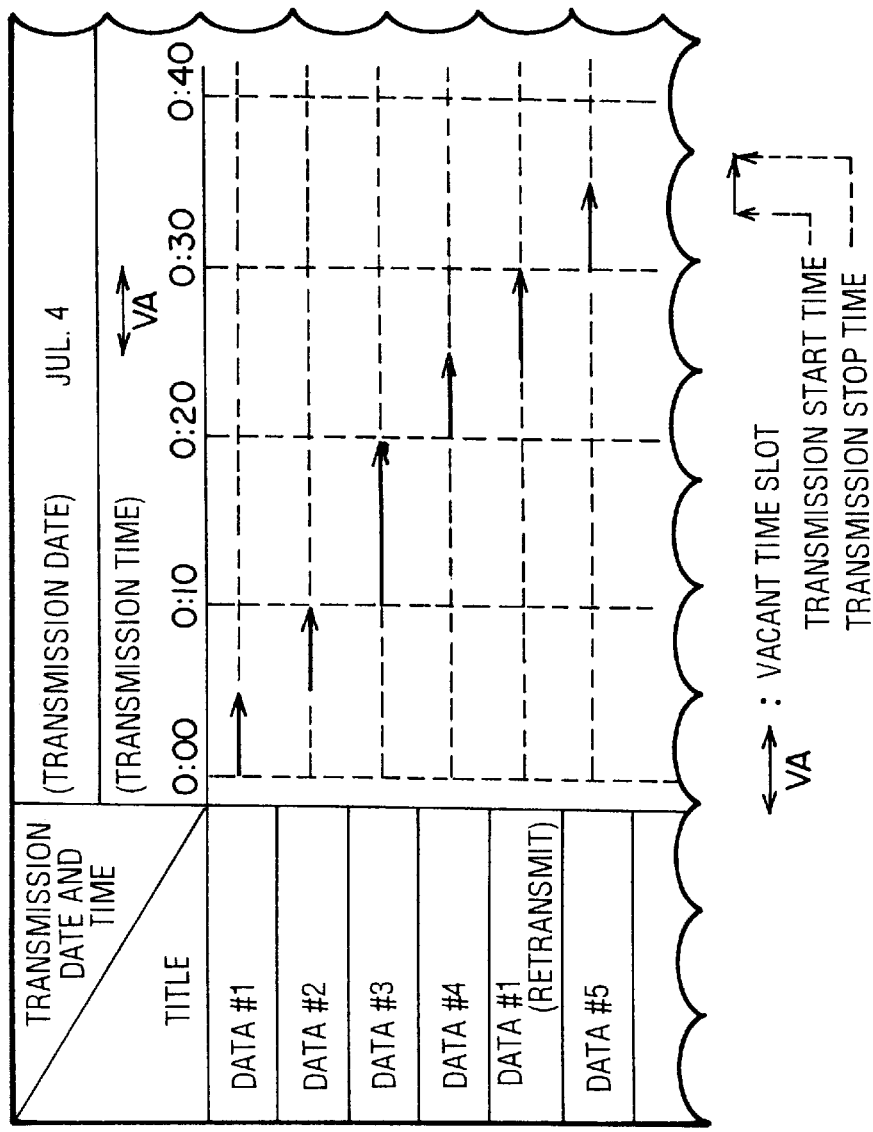
FIG. 6 is a diagram showing a broadcast schedule table in the second embodiment.

FIG. 6 illustrates such a rearranged broadcast schedule, showing that a vacant time slot (VA) from 0:25 to 0:30 is used to retransmit data #1.

Returning to FIG. 5, at the time defined in the newly delivered broadcast schedule, the schedule manager 12 commands the data storage unit 11 to output the relevant transmission data and the retransmission data to the packet generator 15. At the same time, the schedule manager 12 also commands the schedule storage unit 13 to output the latest broadcast schedule to the packet generator 15.

In the terminal station, the received transmission data is supplied from the data reassembler 25 to an error checker 33. This error checker 33 checks whether the massage contains any error or not, and if no error is found, it forwards the data to the output/storage unit 26. If any error is found, the error checker 33 reports the schedule manager 32 that the station failed to receive the transmission data. Searching the broadcast schedule, the schedule manager 32 picks up the retransmission date and time for the missing transmission data and sends them to the data reassembler 25 to prepare for reception of the retransmission data.

In the way described above, the system can easily recover correct information even if it failed to receive data at the first transmission.

The following description will now provide a third embodiment of the present invention, which will propose an alternative method to insert a retransmission process into the broadcast schedule.

Figure 7:
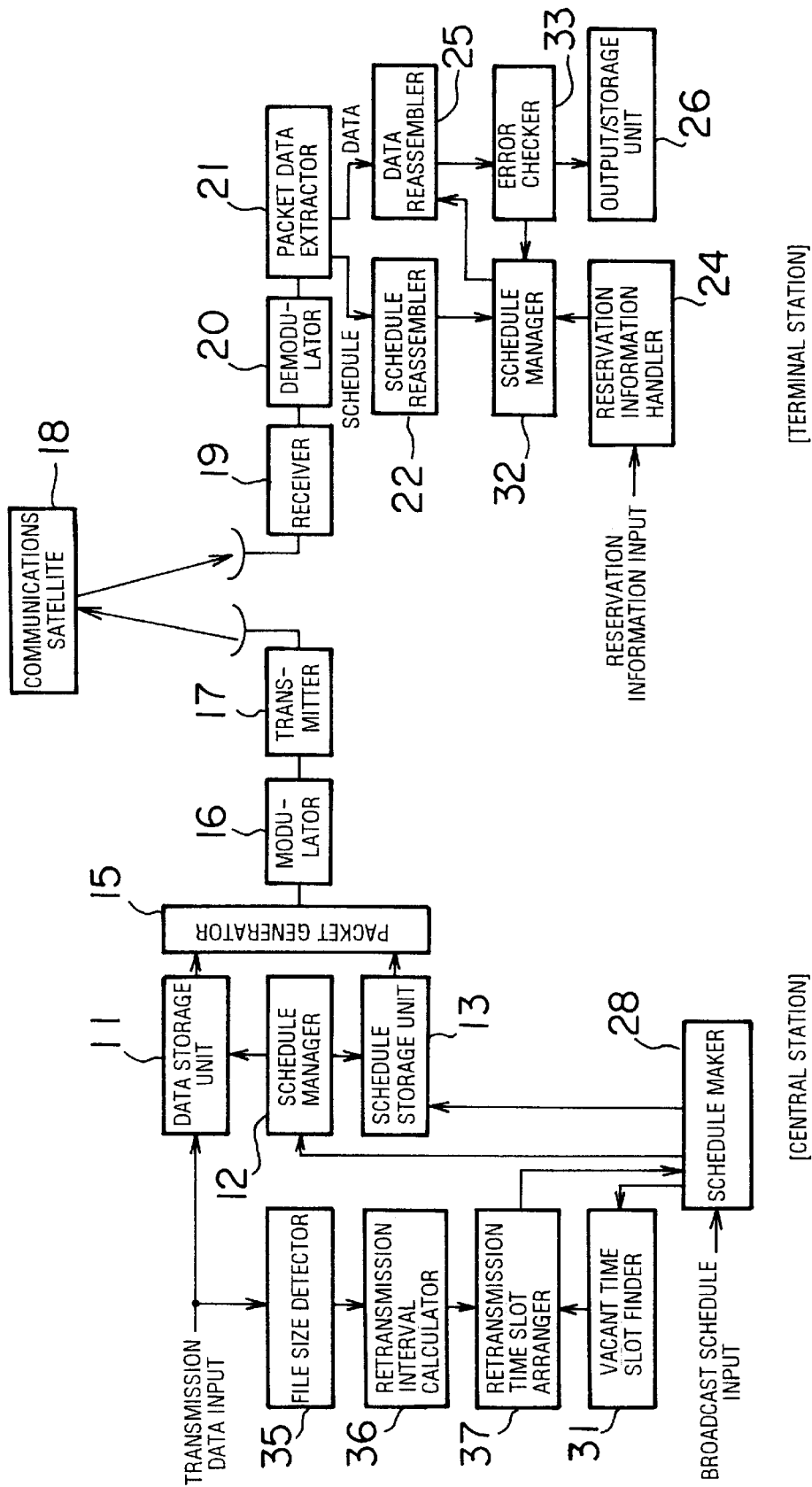
FIG. 7 is a diagram showing the structure of a third embodiment.
Figure 8:
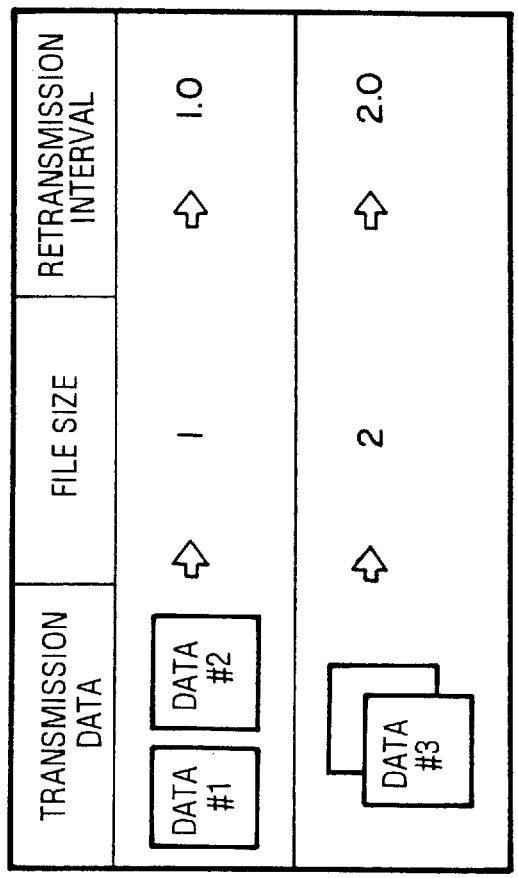
FIG. 8 is a table to translate from file size to retransmission interval.

FIG. 7 is a block diagram showing the structure of the third embodiment. Since this embodiment has basically the same structure as that of the second embodiment, the following description will focus on its distinctive points, while maintaining the consistent reference numerals for the common elements.

In the third embodiment, a file size detector 35 detects a file size of each data to be transmitted and sends it to a retransmission interval calculator 36. By consulting its internal table that defines intervals of data retransmissions as a function of file sizes (or alternatively, by calculating it from the given file size), the retransmission interval calculator 36 obtains the retransmission interval and sends it to a retransmission time slot arranger 37. From the plurality of vacant time slots, the retransmission time slot arranger 37 selects a time slot which most meets with the specified retransmission interval and requests the schedule maker 28 to rearrange the broadcast schedule so that the transmission data be retransmitted in the selected time slot. The structure of the terminal station in this embodiment is identical to that of the second embodiment.

Figure 9:
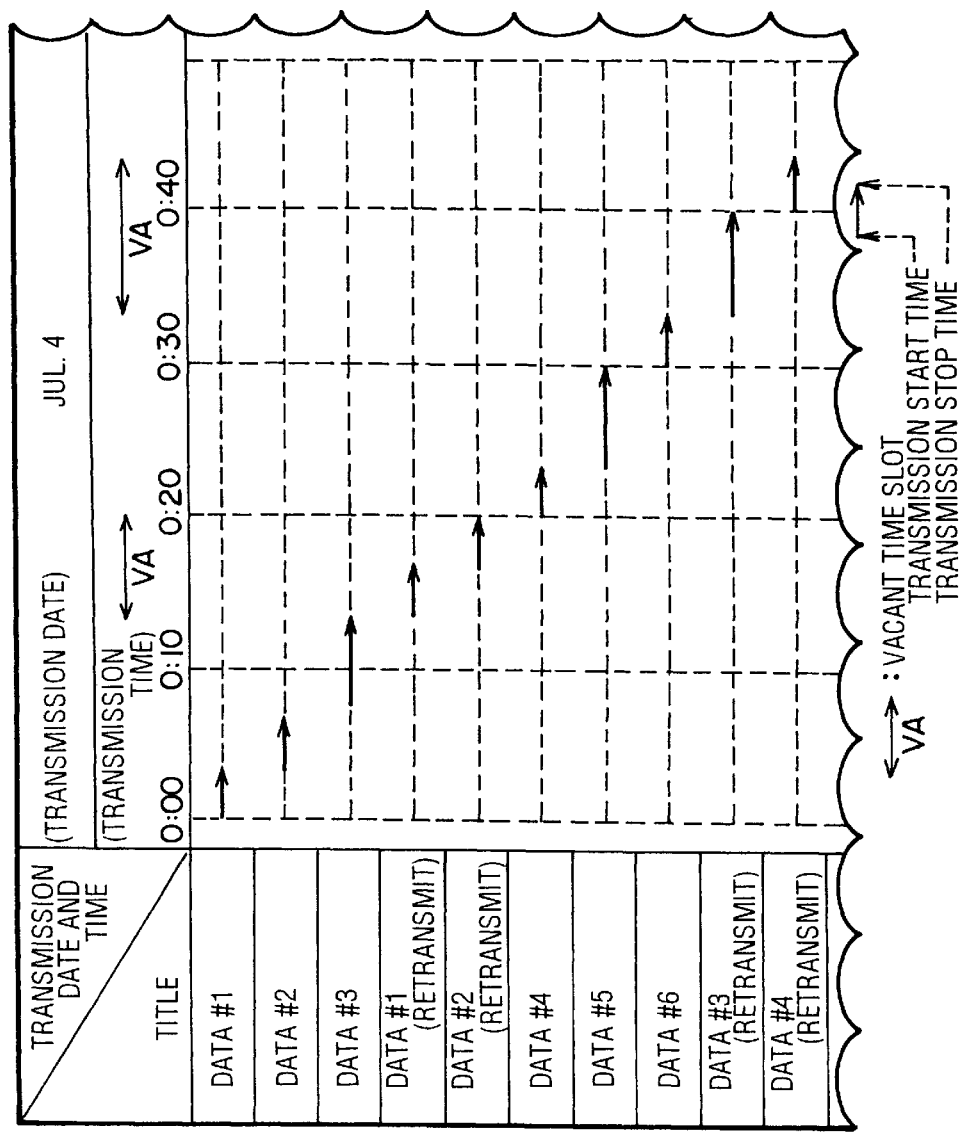
FIG. 9 is a diagram showing a broadcast schedule table in the third embodiment.

As a variant of this embodiment, the retransmission interval calculator 36 may be configured such that it chooses retransmission data in consideration of their file sizes to fit into the vacant time slots. FIG. 9 specifically shows such a configuration. That is, a vacant time slot (VA) just before 0:20 is used to resend two equally small data #1 and #2 and another time slot (VA) around 0:40 is assigned to a combination of large-sized data #3 and small-sized data #4, thus efficiently utilizing the vacant time slots.

The following description will devote to a fourth embodiment of the present invention, which will propose another method to insert a retransmission process into the broadcast schedule differently from the second or third embodiment.

Figure 10:
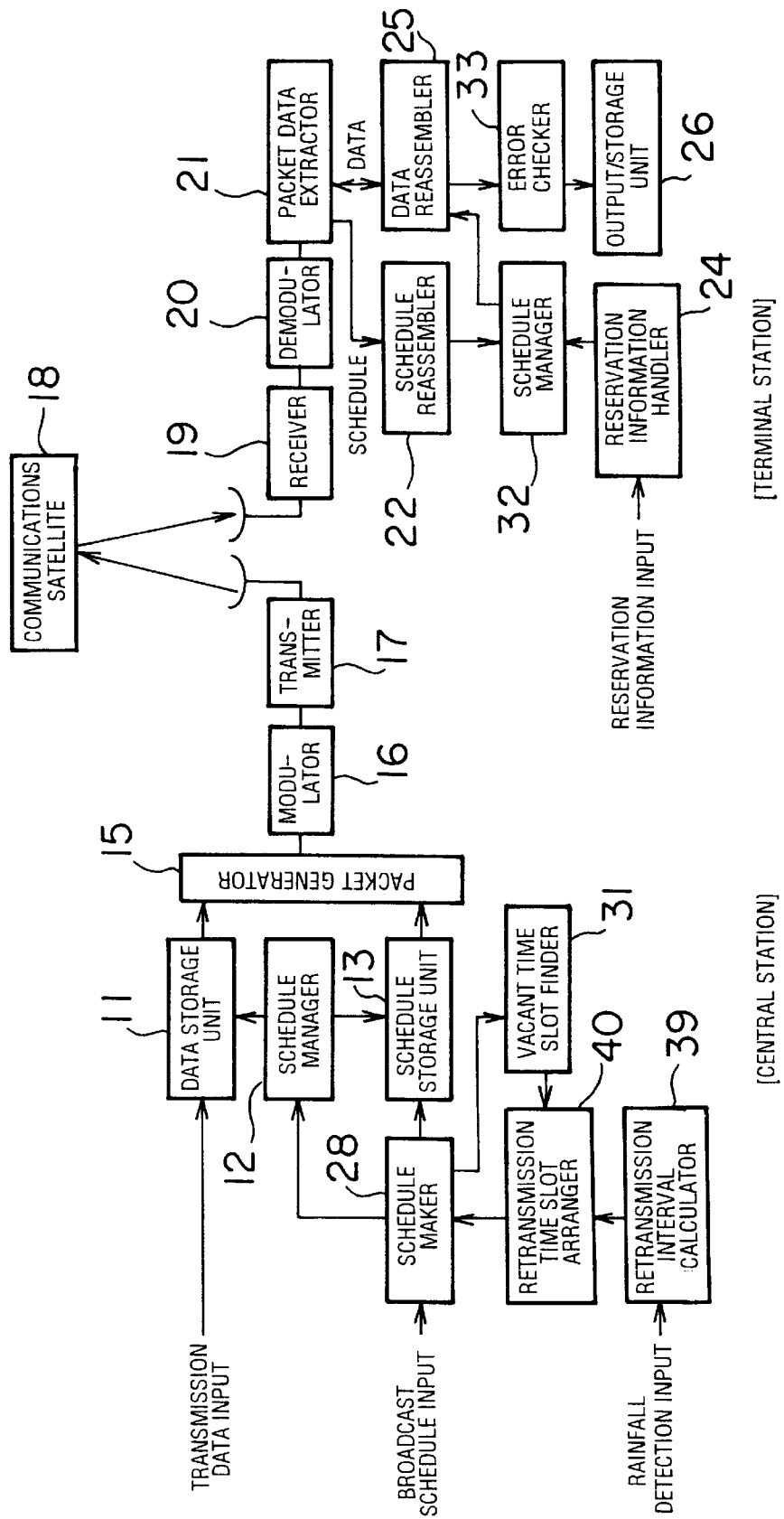
FIG. 10 is a diagram showing the structure of a fourth embodiment.

FIG. 10 is a block diagram showing the structure of the fourth embodiment. Since this embodiment has basically the same structure as that of the second embodiment, the following description will focus on its distinctive points, while maintaining the consistent reference numerals for the common elements.

Figure 11:
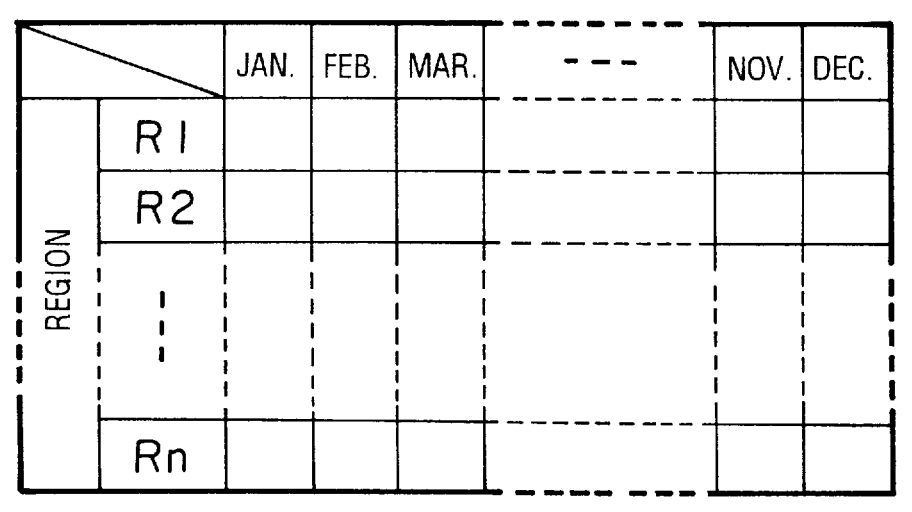

In the fourth embodiment, a retransmission interval calculator 39 has a rainfall duration table as shown in FIG. 11. This table stores statistical data to estimate the duration of heavy rainfalls above a predetermined threshold in each region and in each month based on the past meteorological observation data. Reported from an external source that a heavy rainfall above the threshold is observed, the retransmission interval calculator 39 retrieves an estimated rainfall duration from the rainfall duration table corresponding to the region where the central station is located as well as to the date and time of the rainfall, and sends the duration to a retransmission time slot arranger 40. The retransmission time slot arranger 40 then requests the schedule maker 28 to rearrange the broadcast schedule so that the retransmission data be sent in one of the vacant time slots that will make the retransmission interval longer than the estimated rainfall duration. Note here that FIG. 10 omits the retransmission schedule maker 30 in FIG. 5, and that the structure of the terminal station is identical to that of the second embodiment.

Figure 12:
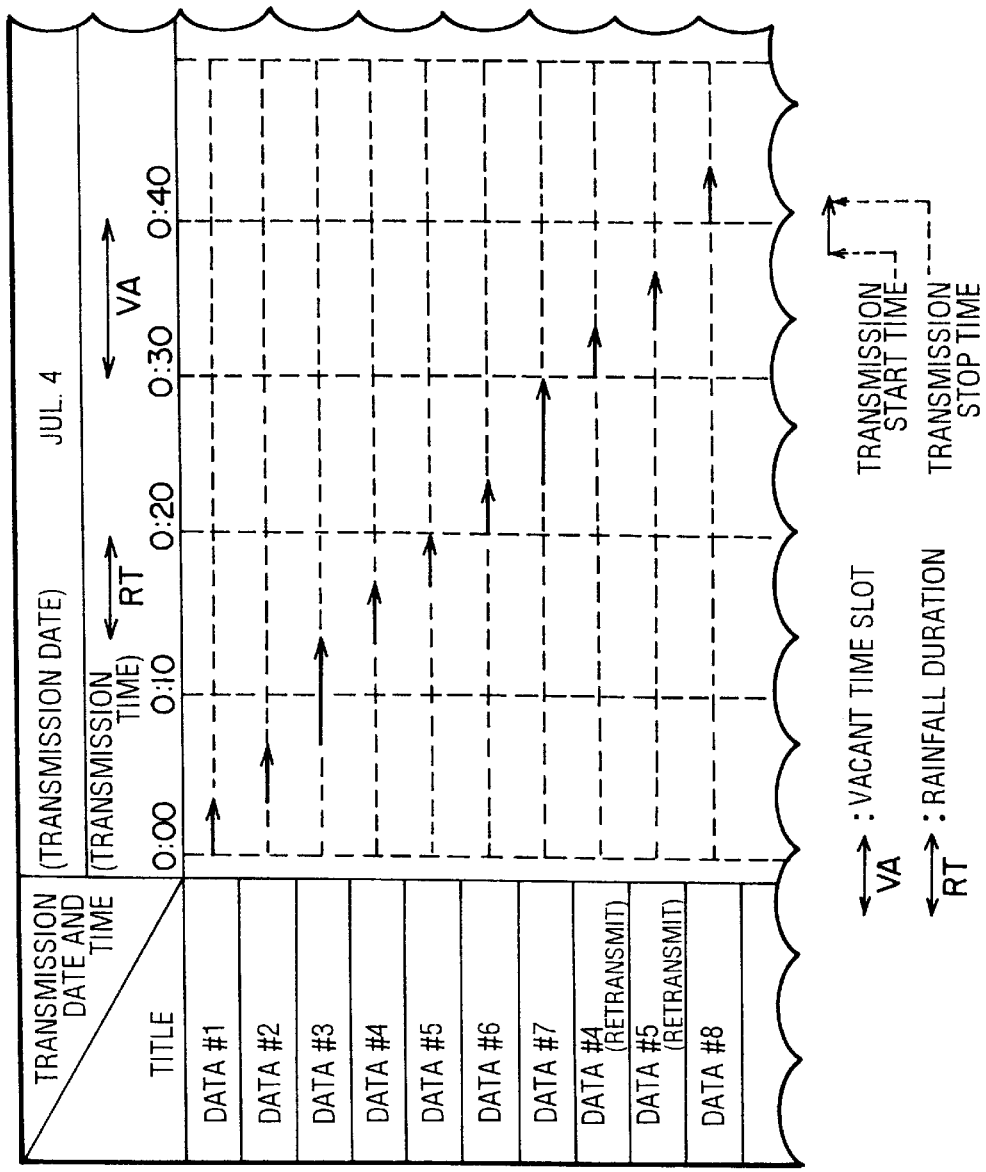
FIG. 12 is a diagram showing a broadcast schedule table in the fourth embodiment.

Assume that the transmission of data #4 and #5 are caught in a heavy rain (RT) as shown in FIG. 12. If the estimated rainfall duration obtained from the rainfall duration table is seven minutes, a vacant time slot (VA) starting at 0:30 can be a candidate for retransmission time of the data #4 and #5. However, if the estimated rainfall duration is twenty minutes, that time slot (VA) from 0:30 cannot be selected but another time slot available later will be used for resending the data #4 and #5. This method is a countermeasure to a heavy rainfall that may degrade the quality of transmission signals from the central station to the communications satellite 18. Generally speaking, heavy rains will not last so long time, and therefore, it is expected that the signal quality will be recovered in a certain period of time. Taking this into consideration, the fourth embodiment postpones data retransmissions until the heavy rainfall is thought to have finished.

The following description will now explain a fifth embodiment of the present invention, which will enhance the fourth embodiment by allowing it to reserve some spare time slots in the broadcast schedule in preparation for data retransmission.

Figure 13:
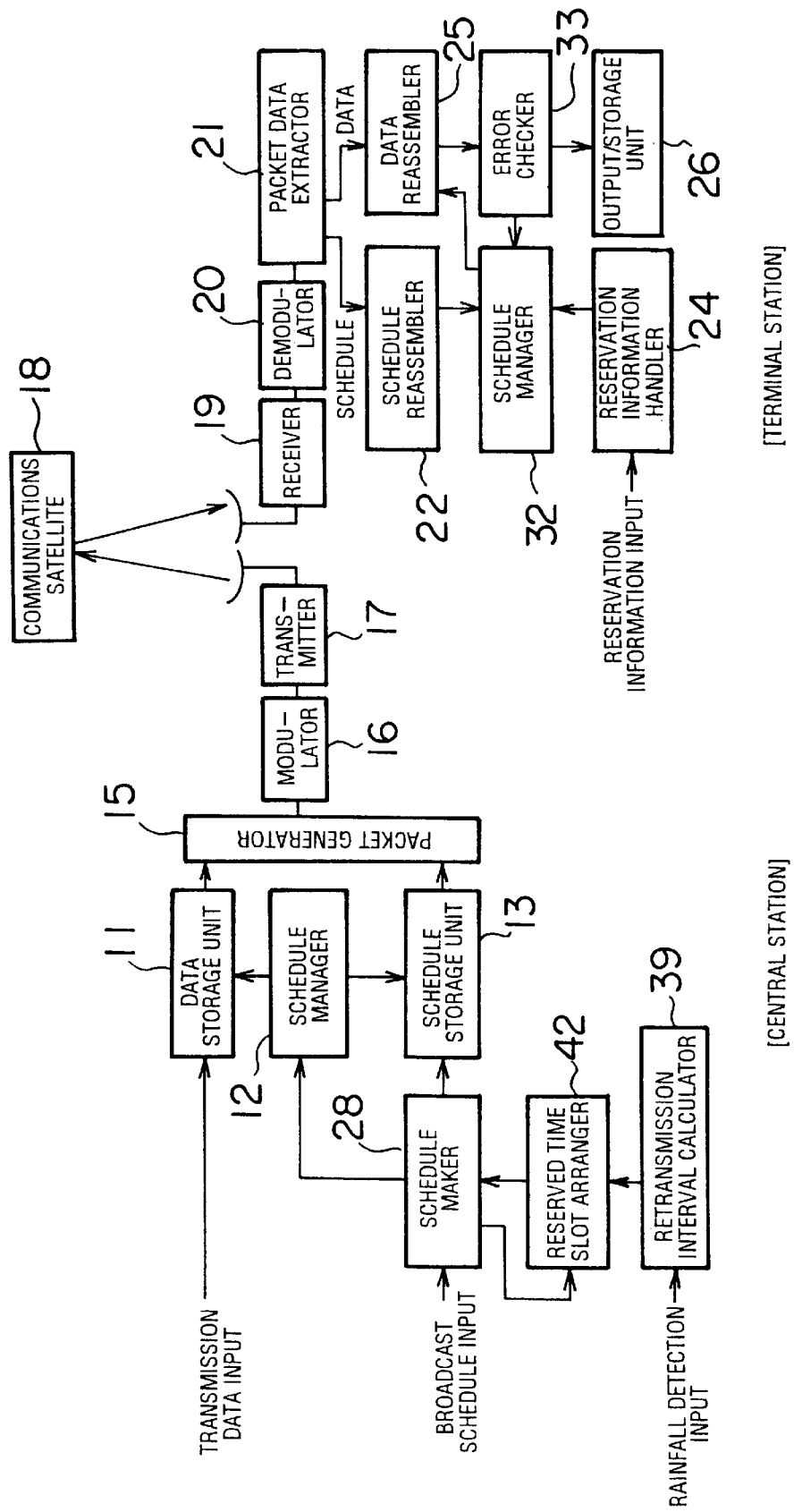
FIG. 13 is a diagram showing the structure of a fifth embodiment.

FIG. 13 is a block diagram showing the structure of the fifth embodiment. Since this embodiment has basically the same structure as that of the fourth embodiment, the following description will focus on its distinctive points, while maintaining the consistent reference numerals for the common elements.

In the fifth embodiment, the broadcast schedule has a plurality of reserved time slots which have been exclusively reserved for the message retransmission. Out of those reserved time slots, a reserved time slot arranger 42 selects one that will provide a retransmission interval no less than the estimated rainfall duration, and then requests the schedule maker 28 to rearrange the broadcast schedule so that the message be retransmitted at the selected reserved time slot. Note that FIG. 13 also omits the retransmission schedule maker 30 shown in FIG. 5, and the structure of the terminal station in this embodiment is identical to that of the second embodiment.

Figure 14:
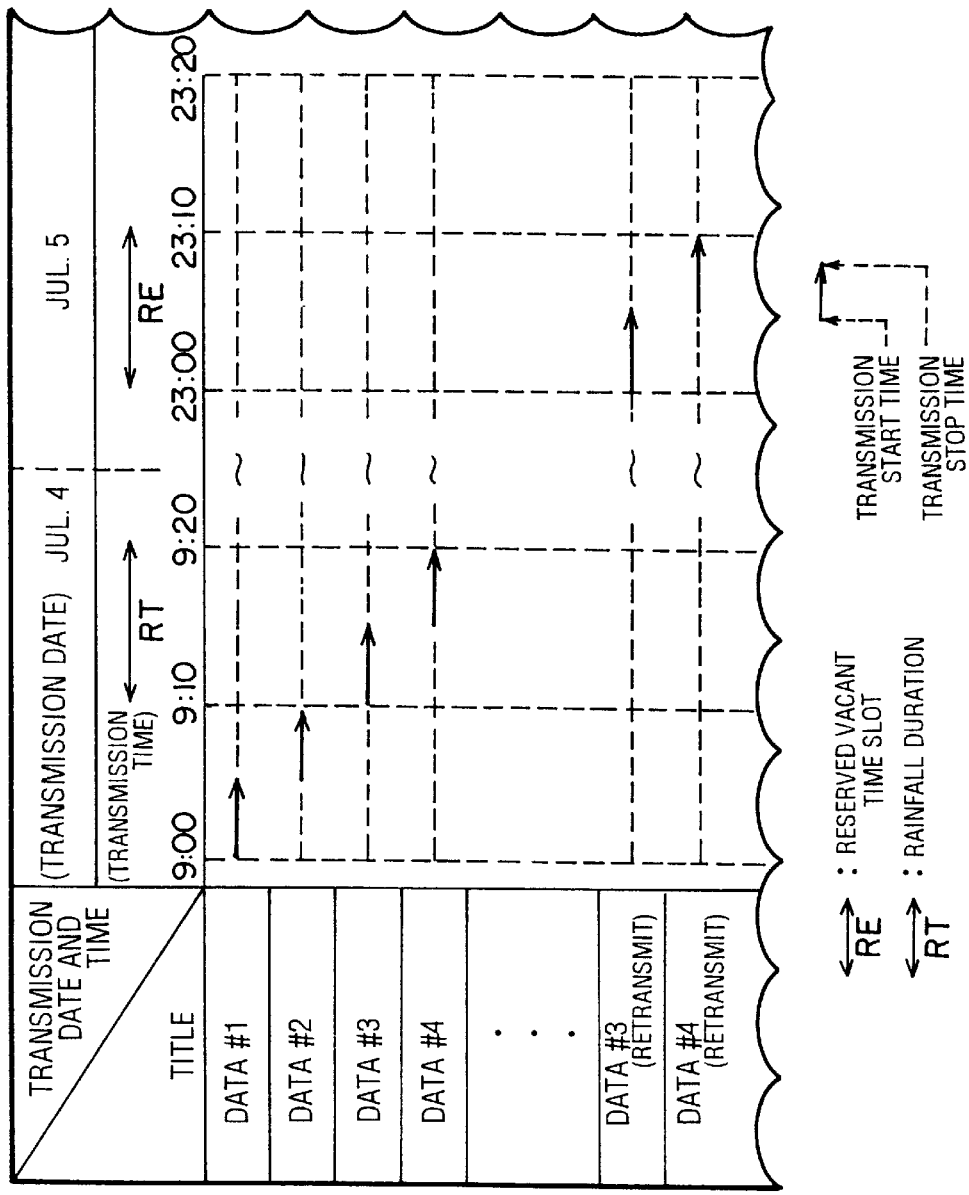
FIG. 14 is a diagram showing a broadcast schedule table in the fifth embodiment.

FIG. 14 shows a specific situation that the transmission of data #3 and #4 are caught in a heavy rain (RT). In this case, the fifth embodiment retransmits the data #3 and #4 in a reserved time slot (RE) which comes late enough to satisfy the requirement of the estimated rainfall duration retrieved from the rainfall duration table.

With the reserved time slots (RE) prepared in advance, the fifth embodiment eliminates the searching operations for the vacant time slots (VA) required in the fourth embodiment. The vacant slot may not be always available by nature but rather tends to be short, and this could make the data retransmission impossible in some extreme cases. The reserved time slots (RE), however, will resolve such concern.

The following description will now explain a sixth embodiment of the present invention, which intends to reduce the amount of transmission data by only sending a changed part (i.e., sending only a difference between previously sent data and currently sending data).

Figure 15:
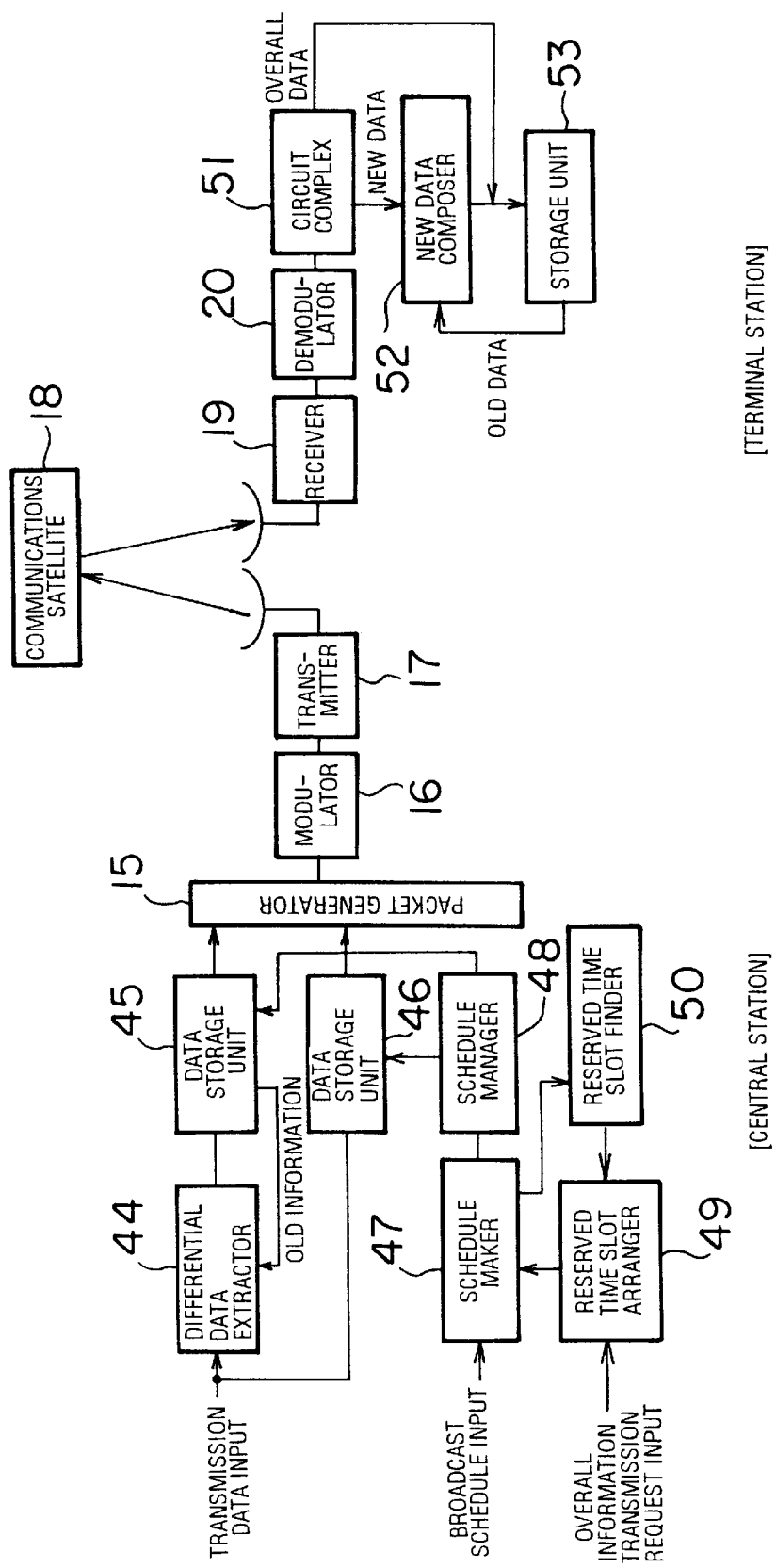
FIG. 15 is a diagram showing the structure of a sixth embodiment.

FIG. 15 is a block diagram showing the structure of the sixth embodiment. Since this embodiment has basically the same structure as that of the second embodiment, the following description will focus on its distinctive points, while maintaining the consistent reference numerals for the common elements.

In the central station of this sixth embodiment, various transmission data are supplied to a differential data extractor 44 as well as being stored in a data storage unit 46. Comparing "new data" with "old data," the differential data extractor 44 calculates differential data and supplies it to the data storage unit 45. While the term "new data" used here denotes newly entered data, the term "old data" represents data provided by the data storage unit 45 as indicative of all the information sent out last time. The data storage unit 45 obtains the new data by appending the received differential data to the old data and stores both the new data and the differential data.

A broadcast schedule is entered from an external source to a schedule maker 47. A reserved time slot finder 50 examines this broadcast schedule to find the reserved time slots previously scheduled therein and provides the reserved time slot arranger 49 of the found reserved time slots. The reserved time slot arranger 49 also receives an overall data transmission request signal which initiates a transmission of the data as a whole. Such an overall data transmission is sometimes required, especially in the very first phase of data transmission, because the differential data may not be always informative enough for the receiving stations to restore the original data. Based on this signal and the found reserved time slots, the reserved time slot arranger 49 directs the schedule maker 47 to rearrange the broadcast schedule so as to send the overall data in the reserved time slots. The schedule maker 47 thereby provides the schedule manager 48 with the rearranged broadcast schedule.

According to this broadcast schedule the schedule manager 48 directs the data storage unit 45 to output the differential data to the packet generator 15 and also makes the data storage unit 46 output the overall data to the packet generator 15.

Note that the sixth embodiment actually employs the schedule storage unit 13, retransmission time slot arranger 29, retransmission schedule maker 30, and vacant time slot finder 31 shown in FIG. 5, although they are not shown in FIG. 15.

The following will now explain about the terminal station in the sixth embodiment of the present invention. A circuit complex 51 shown in FIG. 15 is equivalent to six circuit blocks shown in FIG. 5 including the packet data extractor 21, schedule reassembler 22, reservation information handler 24, data reassembler 25, schedule manager 32, and error checker 33. FIG. 15 is further interpreted that the output of the storage unit 53 in FIG. 15 is connected to the input of the output/storage unit 26 in FIG. 5

In the sixth embodiment, the circuit complex 51 outputs either the overall data or the differential data. While the overall data is delivered to a storage unit 53, the differential data is sent to a new data composer 52. The new data composer 52 refreshes the old data in the storage unit 53 by updating it with the received differential data, thereby allowing the storage unit 53 to maintain the latest version of the overall data.

As such, the central station usually transmits only differential data instead of always sending the overall data. This method will improve the efficiency in data transmission. In addition, use of the reserved time slots will make it easy to transmit the overall data whose file size is relatively large.

The following description will now explain a seventh embodiment of the present invention, which provides another method to send the retransmission data differently from the sixth embodiment.

Figure 16:
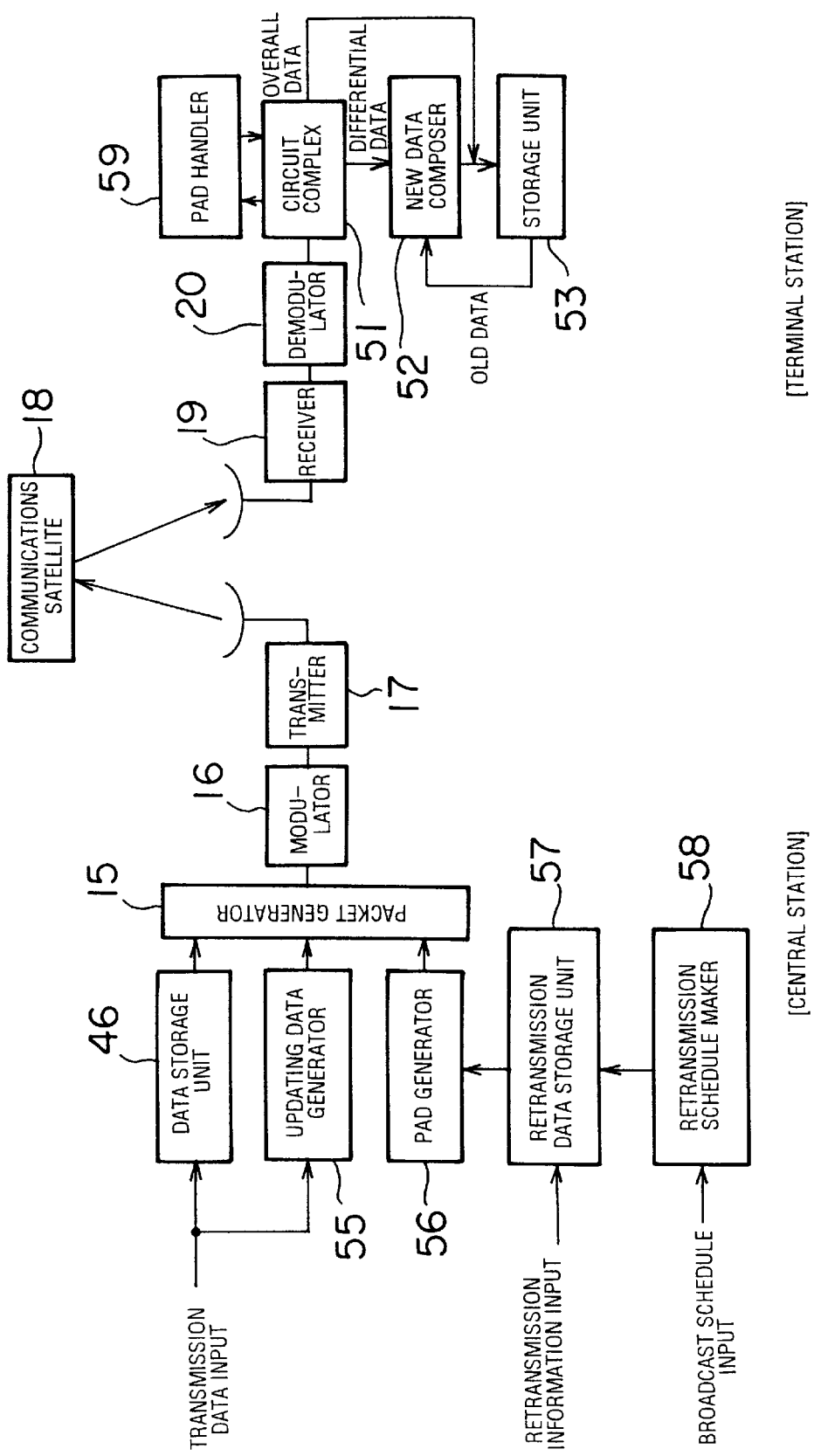
FIG. 16 is a diagram showing the structure of a seventh embodiment.

FIG. 16 is a block diagram showing the structure of the seventh embodiment. Since this embodiment has basically the same structure as that of the sixth embodiment, the following description will focus on its distinctive points, while maintaining the consistent reference numerals for the common elements.

The seventh embodiment actually employs some elements shown in FIG. 5, although not shown in FIG. 16, such as the schedule storage unit 13, retransmission time slot arranger 29, retransmission schedule maker 30, and vacant time slot finder 31. An updating data generator 55 in FIG. 16 corresponds to the differential data extractor 44 and data storage unit 45 in FIG. 15. The seventh embodiment is also equipped with some elements in FIG. 15 such as the schedule maker 47, schedule manager 48, reserved time slot arranger 49, and reserved time slot finder 50, although FIG. 16 does not show those elements.

In the seventh embodiment, the retransmission data is supplied to and stored in a retransmission data storage unit 57, while the broadcast schedule is entered to a retransmission schedule maker 58. The retransmission schedule maker 58 examines the broadcast schedule to find some packets that will have any unused portion in their data field, and informs the retransmission data storage unit 57 of such packets. The retransmission data storage unit 57 directs a pad generator 56 to fill the unused bytes in the packets with the retransmission data as "padding." In response to this direction, the pad generator 56 fill out the remaining bytes as above and outputs the packets to the packet generator 15.

In the terminal station, a pad handler 59 is connected to the packet data extractor 21 and data reassembler 25 in the circuit complex 51. The packet data extractor 21 takes each data field out of the received packets, and the pad handler 59 extracts the retransmission data which is padded in the data field. The extracted retransmission data is sent to the data reassembler 25.

Sending the retransmission data padded in the data field will lead to an improved efficiency in the data transmission.

The following description will now explain an eighth embodiment of the present invention, which provides still another method to send the retransmission data differently from the sixth embodiment.

Figure 17:
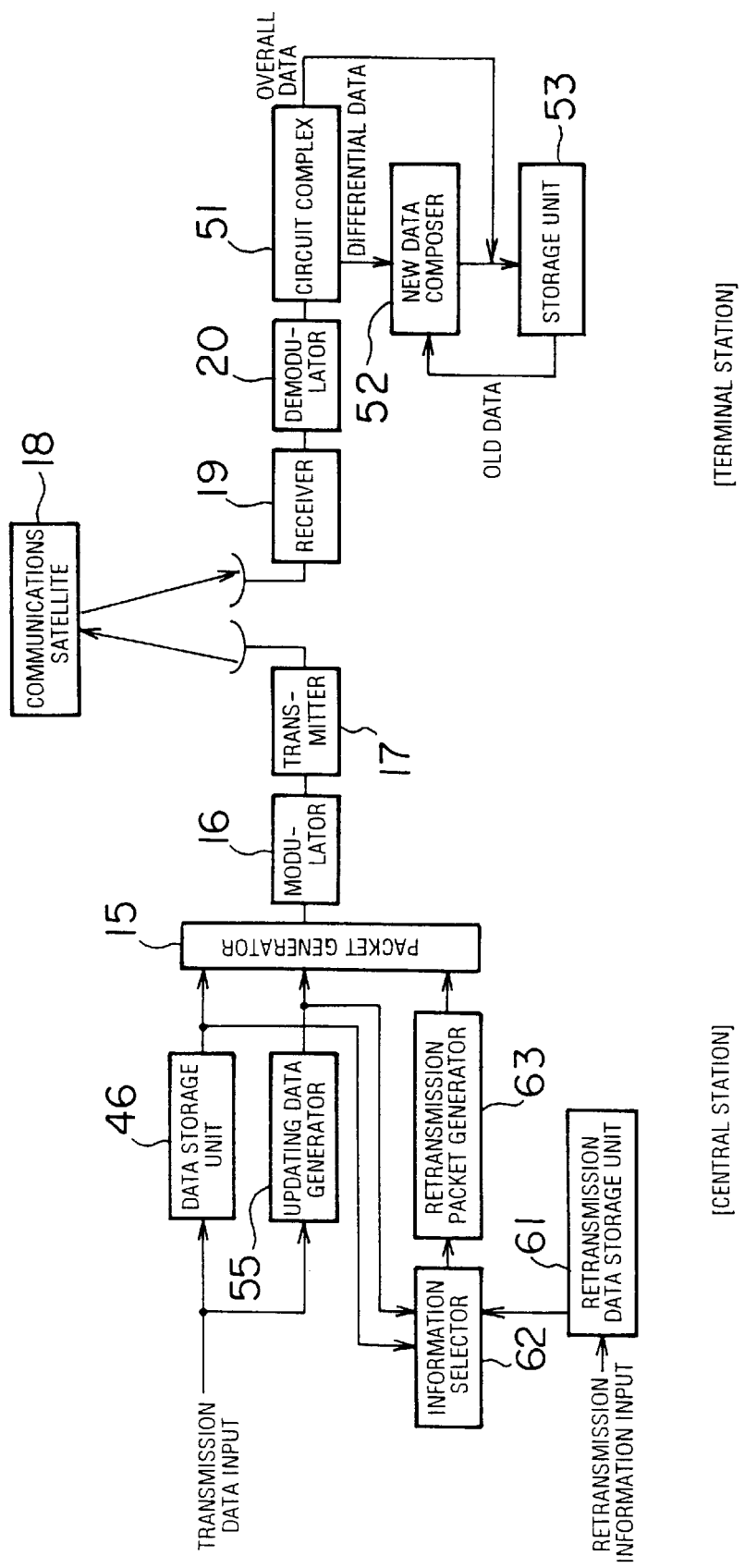
FIG. 17 is a diagram showing the structure of an eighth embodiment.

FIG. 17 is a block diagram showing the structure of the eighth embodiment. Since this embodiment has basically the same structure as that of the sixth embodiment, the following description will focus on its distinctive points, while maintaining the consistent reference numerals for the common elements.

Note that the eighth embodiment actually employs some elements shown in FIG. 5 such as the schedule storage unit 13, retransmission time slot arranger 29, retransmission schedule maker 30, and vacant time slot finder 31, although they are not shown in FIG. 17.

The updating data generator 55 in FIG. 17 corresponds to the differential data extractor 44 and data storage unit 45 in FIG. 15. The eighth embodiment is further equipped with some elements in FIG. 15 such as the schedule maker 47, schedule manager 48, reserved time slot arranger 49, and reserved time slot finder 50, although FIG. 17 omits those elements.

In the eighth embodiment, a particular packet area is reserved within a transmission frame, mainly for use in the data retransmission operations. The retransmission data is sent to a retransmission data storage unit 61 and stored therein. An information selector 62 fetches the retransmission data from the retransmission data storage unit 61 in preference to other sources. When no retransmission data is available in the retransmission data storage unit 61, the information selector 62 fetches the differential data from the updating data generator 55, and when no differential data is available there, it then fetches the overall data from the data storage unit 46. The fetched data (i.e., either the retransmission data, the differential data, or the overall data) is sent to a retransmission packet generator 63 and loaded into the particular packet area. The retransmission packets are thus created and then supplied to the packet generator 15.

As described above, since the particular packet area conveys the retransmission data, the time of retransmission can be clarified. That packet area are also used to carry other information when it is not occupied by the retransmission data, thus preventing the data transmission efficiency from degrading.

The following description will now explain a ninth embodiment of the present invention, which is equipped with a different type of transmitter equipment compared with the eighth embodiment.

Figure 18:
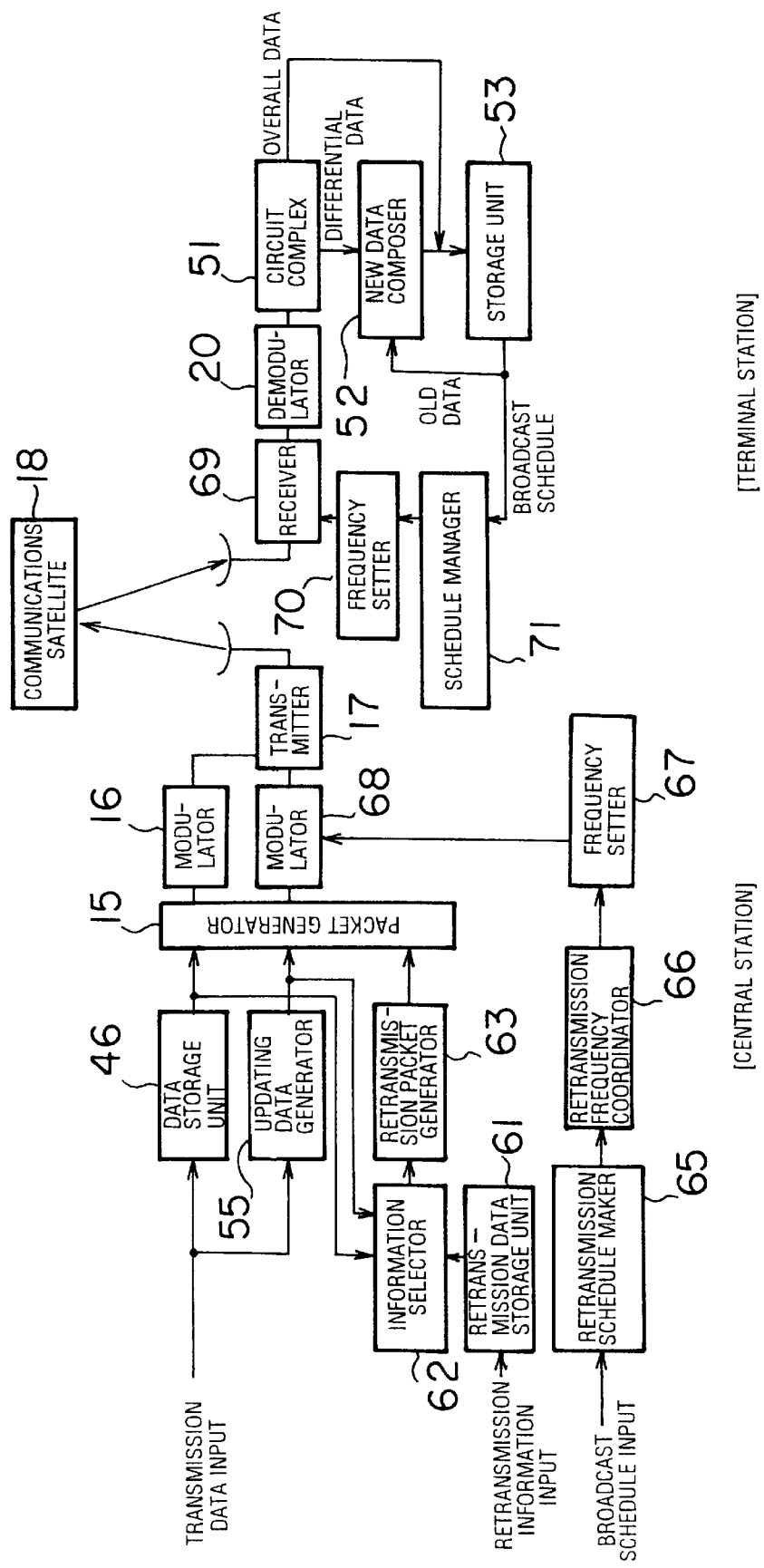
FIG. 18 is a diagram showing the structure of a ninth embodiment.

FIG. 18 is a block diagram showing the structure of the ninth embodiment. Since this embodiment has basically the same structure as that of the eighth embodiment, the following description will focus on its distinctive points, while maintaining the consistent reference numerals for the common elements.

Note that FIG. 18 does not show the schedule storage unit 13, retransmission time slot arranger 29, retransmission schedule maker 30, or vacant time slot finder 31, however, the ninth embodiment actually employs those elements that are shown in FIG. 5.

In the ninth embodiment, after receiving a broadcast schedule from an external source, a retransmission schedule maker 65 tries to find a specific packet transmission schedule which may be programmed in the broadcast schedule. If it is found, a retransmission frequency coordinator 66 will assign a frequency to some specific packets, allowing its exclusive use. A frequency setter 67 directs the modulator 68 to use that frequency for a carrier signal to convey the specific packets when they will arrive from the retransmission packet generator 63 via the packet generator 15. On the other hand, other non-specific packets are transmitted through the modulator 16 as is in the eighth embodiment.

In the terminal station, a schedule manager 71 receives the broadcast schedule from the storage unit 53. Based on the specific packet transmission schedule contained in the received broadcast schedule, the schedule manager 71 activates a frequency setter 70. When the specific packets are scheduled to be transmitted, the activated frequency setter 70 controls the receiver 69 to accept the transmission signals at the frequency assigned to the specific packets.

The above-described ninth embodiment results in a high-speed transmission of main message information by using another frequency to send the retransmission data.

The following description will now explain a tenth embodiment of the present invention, which compresses the overall data discussed in the sixth embodiment.

Figure 19:
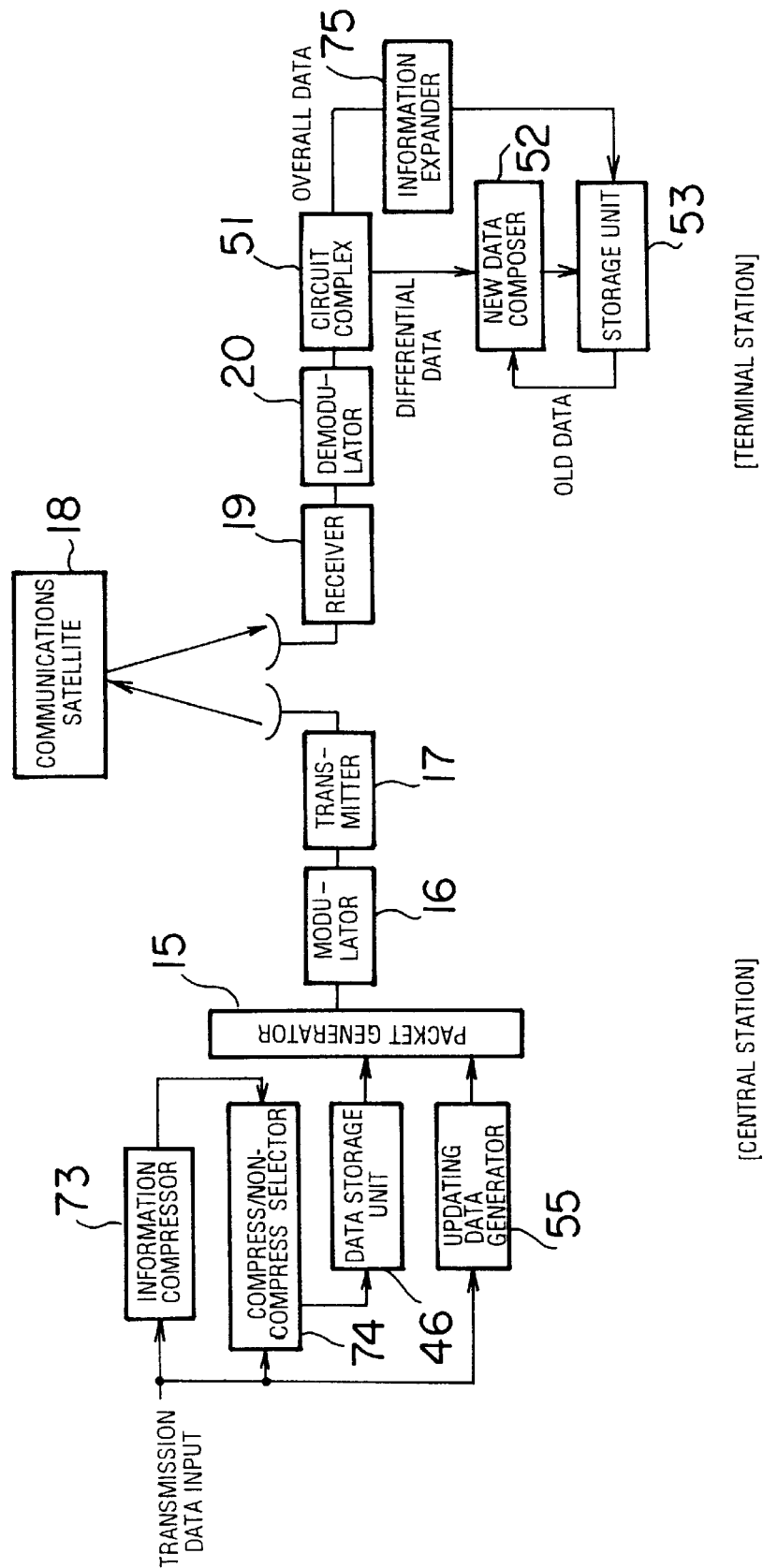
FIG. 19 is a diagram showing the structure of a tenth embodiment.

FIG. 19 is a block diagram showing the structure of the tenth embodiment. Since this embodiment has basically the same structure as that of the sixth embodiment, the following description will focus on its distinctive points, while maintaining the consistent reference numerals for the common elements.

Note here that the tenth embodiment actually employs some elements once discussed in FIG. 5 such as the schedule storage unit 13, retransmission time slot arranger 29, retransmission schedule maker 30, and vacant time slot finder 31, although FIG. 19 omits those elements. The updating data generator 55 in FIG. 19 corresponds to the differential data extractor 44 and data storage unit 45 in FIG. 15. Further, the tenth embodiment also employs some elements in FIG. 15 such as the schedule maker 47, schedule manager 48, reserved time slot arranger 49, and reserved time slot finder 50, although FIG. 19 omits those elements.

In the tenth embodiment, the overall data to be transmitted is distributed not only to the updating data generator 55 but to an information compressor 73 and a compress/non-compress selector 74 as well. The information compressor 73 compresses the overall data with a predetermined data compression algorithm and sends the compressed data to the compress/non-compress selector 74. Comparing the compressed data with the non-compressed data, the compress/non-compress selector 74 selectively sends the compressed data to the data storage unit 46 if the resulted compression ratio meets a predetermined criterion. Otherwise, the non-compressed data is selected and sent thereto.

In the terminal station, the circuit complex 51 forwards the received overall data to an information expander 75, where the data will be expanded (if it is in the compressed form) and supplied to the storage unit 53.

The data compression before transmission described above will promise a higher communication efficiency.

The following description will now explain an eleventh embodiment of the present invention, which allows the terminal station to request a data retransmission to the central station.

Figure 20:
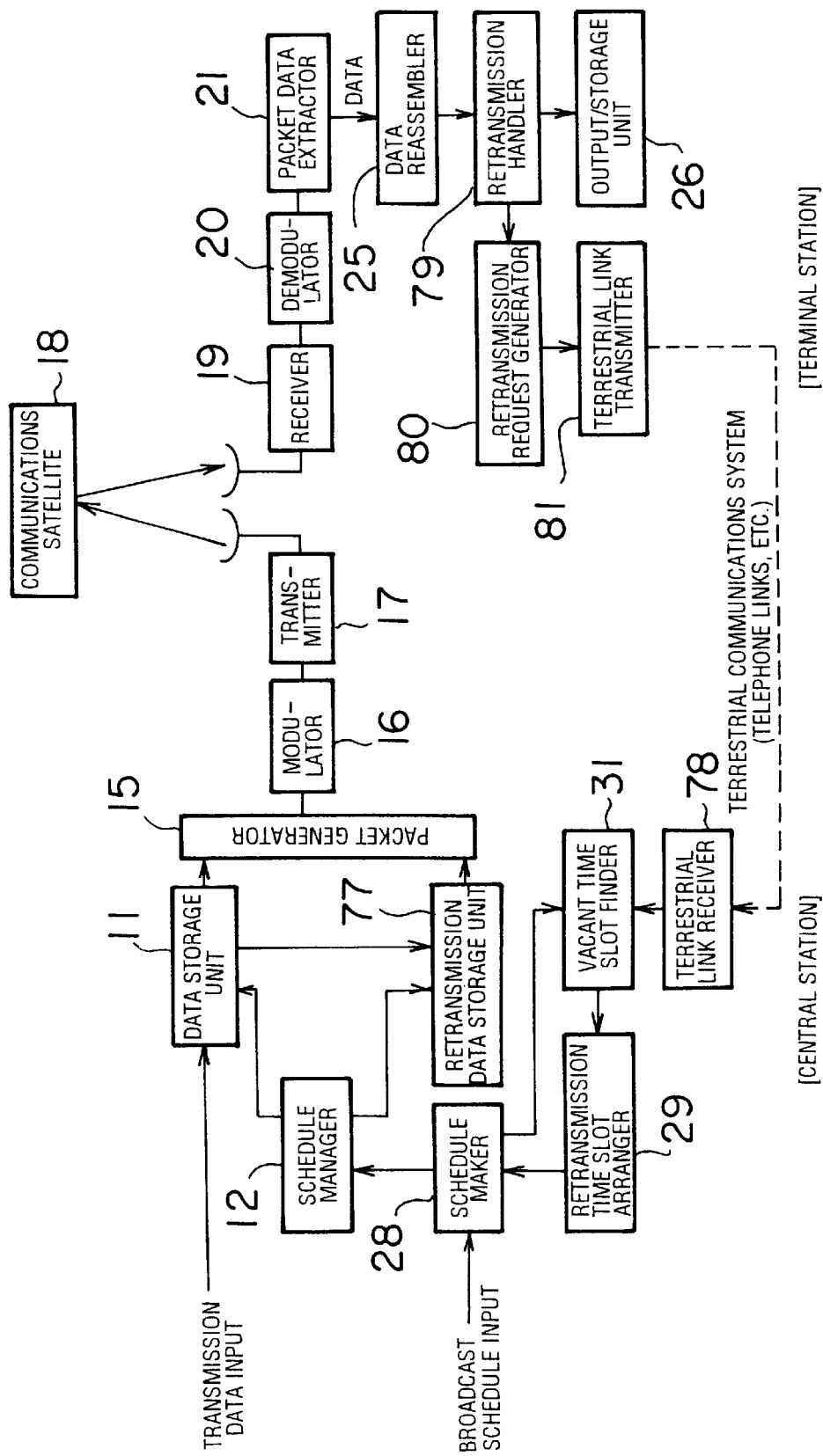
FIG. 20 is a diagram showing the structure of an eleventh embodiment.

FIG. 20 is a block diagram showing the structure of the eleventh embodiment. Since this embodiment has basically the same structure as that of the second embodiment, the following description will focus on its distinctive points, while maintaining the consistent reference numerals for the common elements.

Note here that the eleventh embodiment actually employs the schedule storage unit 13, retransmission schedule maker 30, schedule reassembler 22, reservation information handler 24, and schedule manager 32 discussed in FIG. 5, although FIG. 20 omits those elements. The error checker 33 in FIG. 5 does not exist in this embodiment, however, a retransmission handler 79 deals with transmission errors.

In the eleventh embodiment, a retransmission data storage unit 77 stores retransmission data selectively received from the data storage unit 11. A terrestrial link receiver 78 accepts a retransmission request from the terminal station via a terrestrial link such as telephone lines and forwards the request to the vacant time slot finder 31. Having searched the broadcast schedule for vacant time slots where no transmission is assigned, the vacant time slot finder 31 sends date and time of the found vacant time slots to the retransmission time slot arranger 29 together with the retransmission request. The retransmission time slot arranger 29 then directs the schedule maker 28 to rearrange the broadcast schedule so that the requested retransmission data be sent in the earliest among the available vacant time slots. The schedule maker 28 then supplies the schedule manager 12 with the broadcast schedule rearranged according to the direction. With the supplied broadcast schedule, the schedule manager 12 controls the data storage unit 11 and the retransmission data storage unit 77.

In the terminal station, a retransmission handler 79 is responsible to examine the received data and to judge whether it has successfully arrived or not. If its data integrity is proved, the retransmission handler 79 sends the received data to the output/storage unit 26, and otherwise, it issues a request for retransmission to a retransmission request generator 80. Here the retransmission handler 79 may relax its criteria when the received data is of speech, video, etc. Via a terrestrial link transmitter 81, the retransmission request generator 80 sends a request for retransmission of the missing data to a terrestrial link receiver 78 in the central station.

Efficiency of data transmission will be greatly improved by the above-described structural arrangement where the retransmission occurs only for the data that was unsuccessfully received due to some transmission errors.

The following description will now explain a twelfth embodiment of the present invention, where the terminal station requests the central station to make a retransmission in a different way from the eleventh embodiment.

Figure 21:
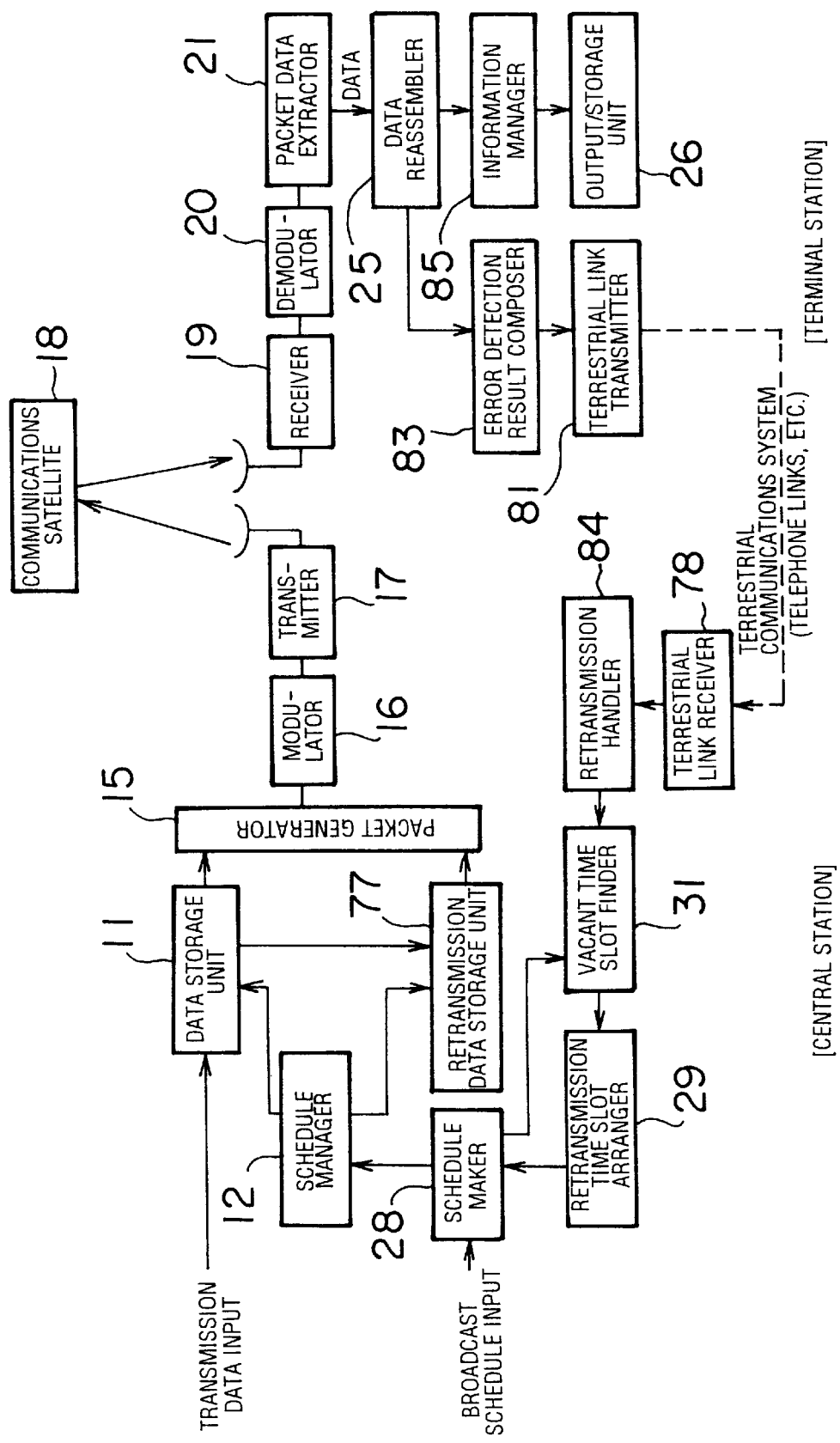
FIG. 21 is a diagram showing the structure of a twelfth embodiment.

FIG. 21 is a block diagram showing the structure of the twelfth embodiment. Since this embodiment has basically the same structure as that of the eleventh embodiment, the following description will focus on its distinctive points, while maintaining the consistent reference numerals for the common elements. Note that the twelfth embodiment actually involves some elements in FIG. 5 such as the schedule storage unit 13, retransmission schedule maker 30, schedule reassembler 22, reservation information handler 24, and schedule manager 32, although FIG. 21 omits those elements.

In the twelfth embodiment, an error detection result composer 83 detects errors in the received data and sends the error status to the central station via the terrestrial link transmitter 81. In the central station, a retransmission handler 84 is monitoring the error status reported from each terminal station. When it receives such error status reports from more than a predetermined number of terminal stations in their response to the same unsuccessful transmission data, the retransmission handler 84 outputs a retransmission request for that data.

Referring back to the terminal station, an information manager 85 replaces the unsuccessful transmission data with retransmission data sent in response to the retransmission request.

The following description will now explain a thirteenth embodiment of the present invention, in which the terminal station shuts off the power when not receiving the signals.

Figure 22:
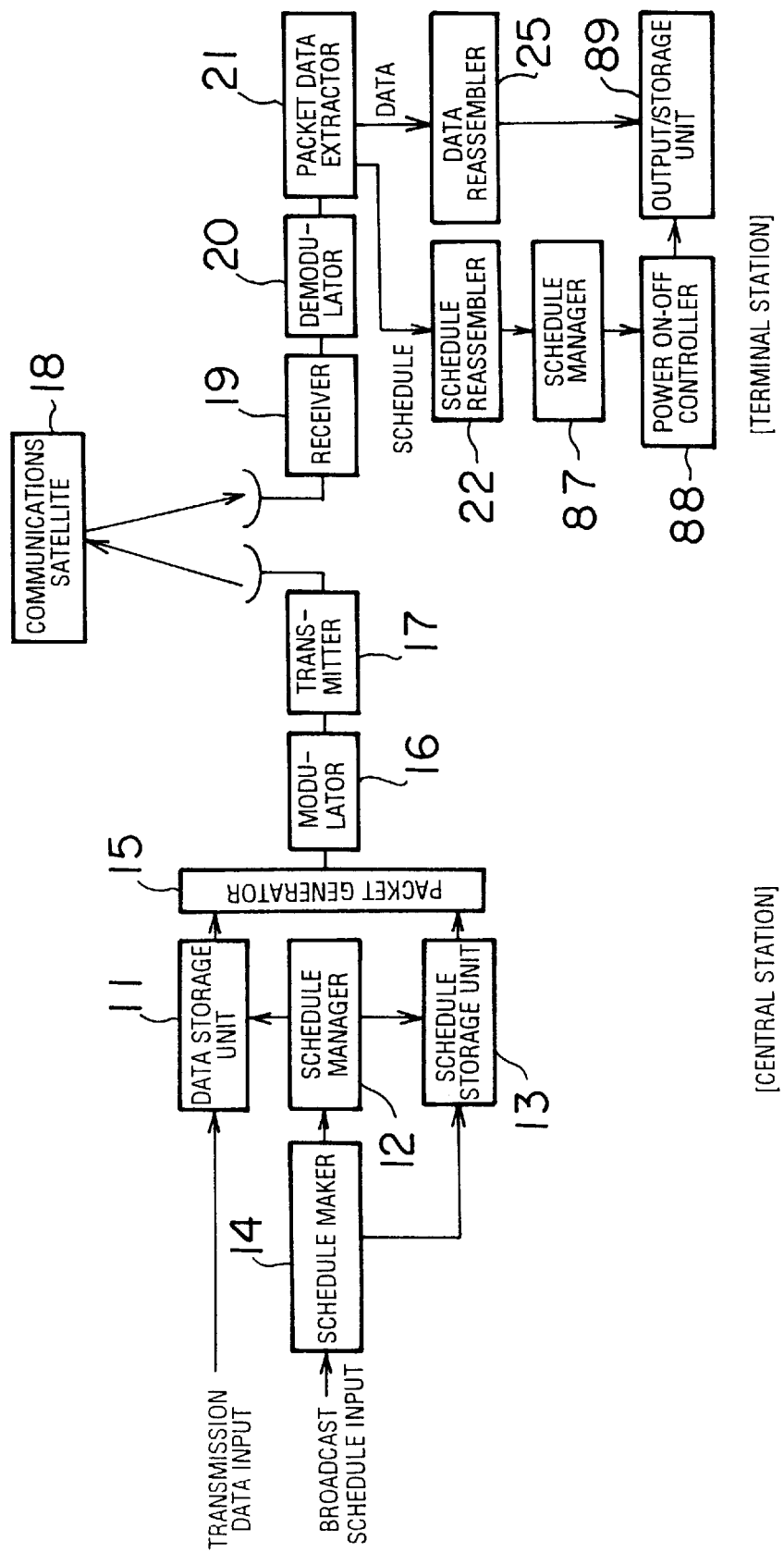
FIG. 22 is a diagram showing the structure of a thirteenth embodiment.

FIG. 22 is a block diagram showing the structure of the thirteenth embodiment. Since this embodiment has basically the same structure as that of the first embodiment, the following description will focus on its distinctive points, while maintaining the consistent reference numerals for the common elements.

Based on the received broadcast schedule, a schedule manager 87 in the thirteenth embodiment sends a command to a power on-off controller 88 only when the transmission services relevant to the terminal station are available. In response to the command, the power on-off controller 88 sends a power on-off control signal to an output/storage unit 89 so that the unit be powered up at the transmission start time and shut off at the transmission stop time.

Optionally, the power on-off controller 88 may be configured so as to apply the power control to the whole terminal station hardware except the part that should always stand by for receiving the broadcast schedule.

The above usage of the broadcast schedule will prevent the terminal station hardware from being activated in vain.

The following description will now explain a fourteenth embodiment of the present invention, which enables the central station to regulate the terminal stations on their data reception.

Figure 23:
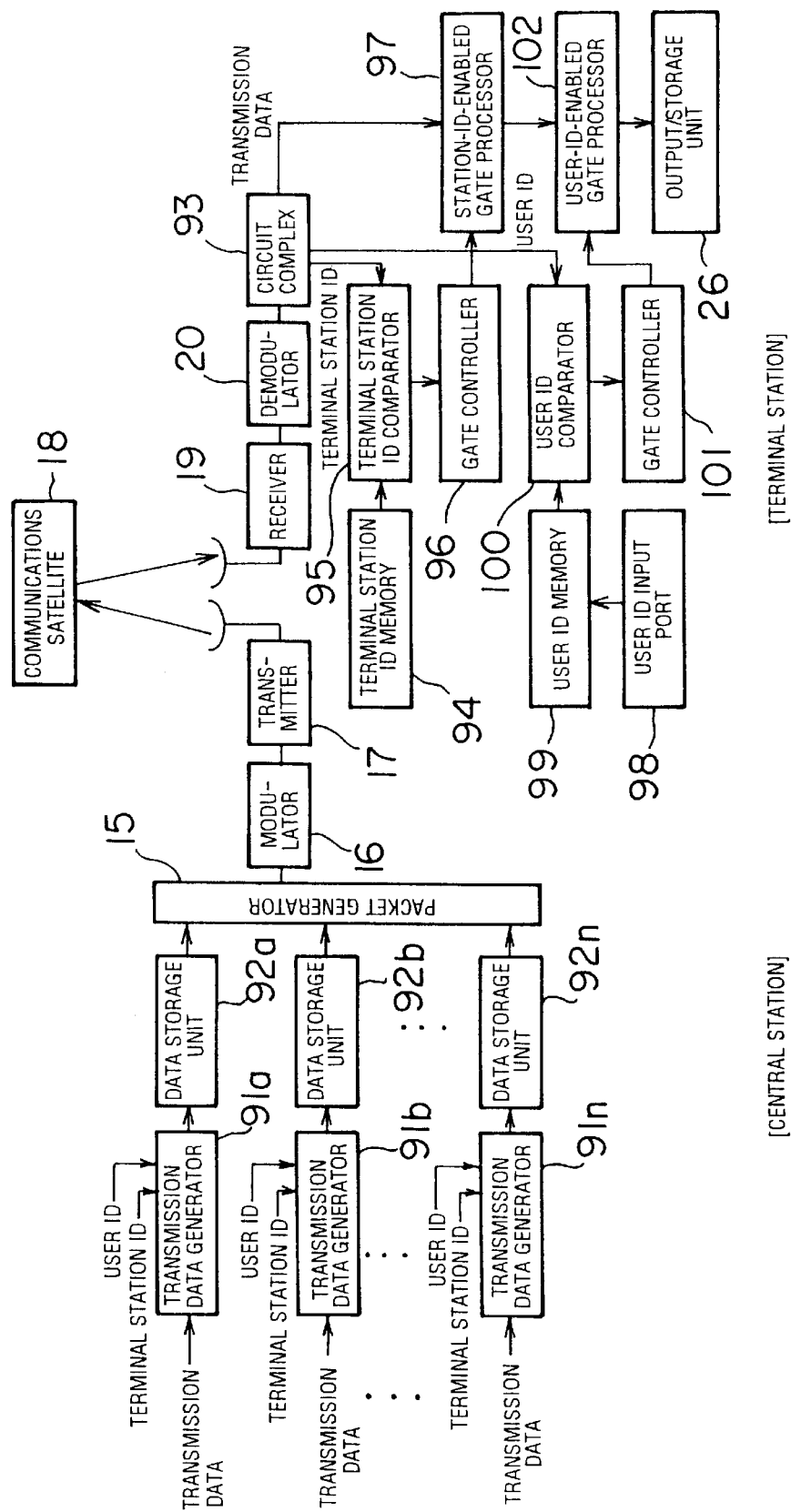
FIG. 23 is a diagram showing the structure of a fourteenth embodiment.

FIG. 23 is a block diagram showing the structure of the fourteenth embodiment. Since this embodiment has basically the same structure as that of the second embodiment, the following description will focus on its distinctive points, while maintaining the consistent reference numerals for the common elements.

Note here that the fourteenth embodiment actually involves some elements in FIG. 5 such as the schedule manager 12, schedule storage unit 13, schedule maker 28, retransmission time slot arranger 29, retransmission schedule maker 30, and vacant time slot finder 31, although FIG. 23 omits those elements. A circuit complex 93 is equivalent to a collection of the schedule reassembler 22, reservation information handler 24, data reassembler 25, schedule manager 32, and error checker 33.

The fourteenth embodiment specifically presents a system configuration for sending data from a central station to a plurality of terminal stations. Transmission data generators 91a–91n affix a user ID and a terminal station ID to each data to be transmitted. The user IDs and terminal station IDs are information for specifying particular users and terminal stations who are allowed to receive the transmission data. Data storage units 92a–92n have the same function as that of the data storage unit 11 in FIG. 5.

The terminal station stores its own ID in a terminal station ID memory 94. A terminal station ID comparator 95 compares the terminal station ID affixed to the received transmission data with the ID of its own, and sends a permission signal to a gate controller 96 if the two IDs coincide with each other. Responding to the permission signal, the gate controller 96 sends a gate opening signal to a station-ID-enabled gate processor 97. According to this signal, the station-ID-enabled gate processor 97 forwards the received transmission data from a circuit complex 93 (i.e., the output of the error checker 33 in FIG. 5) to a user-ID-enabled gate processor 102.

The user ID is entered from an external source to a user ID memory 99 via a user ID input port 98, while the terminal station ID is processed as above. A user ID comparator 100 compares the user ID affixed to the received data with the user ID stored in the user ID memory 99 and sends a permission signal to a gate controller 101 if the two user IDs meet with each other. In response to this permission signal, the gate controller 101 sends a gate opening signal to a user-ID-enabled gate processor 102. According to the gate opening signal, the user-ID-enabled gate processor 102 transfers the received data from the station-ID-enabled gate processor 97 to the output/storage unit 26.

By attaching a user ID and a terminal station ID to each transmission data as described above, the information will reach only limited users and terminal stations.

The following description will now explain a fifteenth embodiment of the present invention, which provides another configuration that enables the central station to regulate the terminal stations on their data reception.

Figure 24:
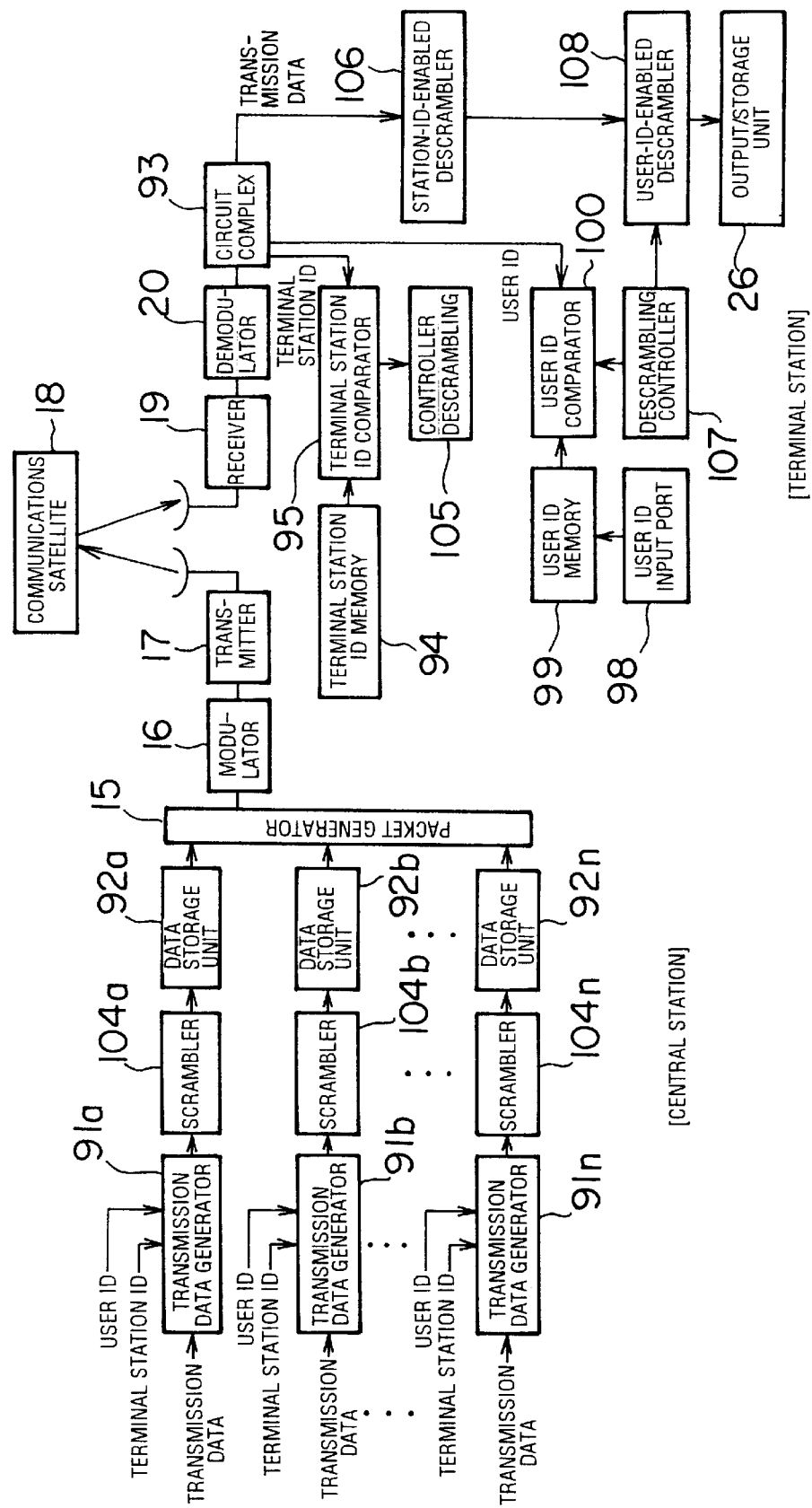
FIG. 24 is a diagram showing the structure of a fifteenth embodiment.

FIG. 24 is a block diagram showing the structure of a fifteenth embodiment. Since this embodiment has basically the same structure as that of the fourteenth embodiment, the following description will focus on its distinctive points, while maintaining the consistent reference numerals for the common elements.

The fifteenth embodiment actually involves some elements in FIG. 5, although they are not shown in FIG. 24, such as the schedule manager 12, schedule storage unit 13, schedule maker 28, retransmission time slot arranger 29, retransmission schedule maker 30, and vacant time slot finder 31.

This embodiment places scramblers 104a–104n next to the transmission data generators 91a–91n in order to apply a data scrambling process to the transmission data.

In the terminal station, the terminal station ID and user ID are obtained by partly descrambling the received transmission data and then sent to the terminal station ID comparator 95 and user ID comparator 100, respectively. A descrambling controller 105, upon reception of the permission signal from the terminal station ID comparator 95, signals a processing request to a station-ID-enabled descrambler 106. On this request, the station-ID-enabled descrambler 106 descrambles the message data received from the circuit complex 93 and outputs the result to a user-ID-enabled descrambler 108.

Similarly to the above, a descrambling controller 107, upon reception of the permission signal from the user ID comparator 100, signals a processing request to the user-ID-enabled descrambler 108. On this request, the user-ID-enabled descrambler 108 descrambles the data received from the station-ID-enabled descrambler 106 and outputs its result to the output/storage unit 26.

Data scrambling/descrambling processes can be used in that way to regulate the data reception of the terminal stations.

The following description will now explain a sixteenth embodiment of the present invention, which provides still another configuration that permits the central station to regulate the terminal stations on their data reception.

Figure 25:
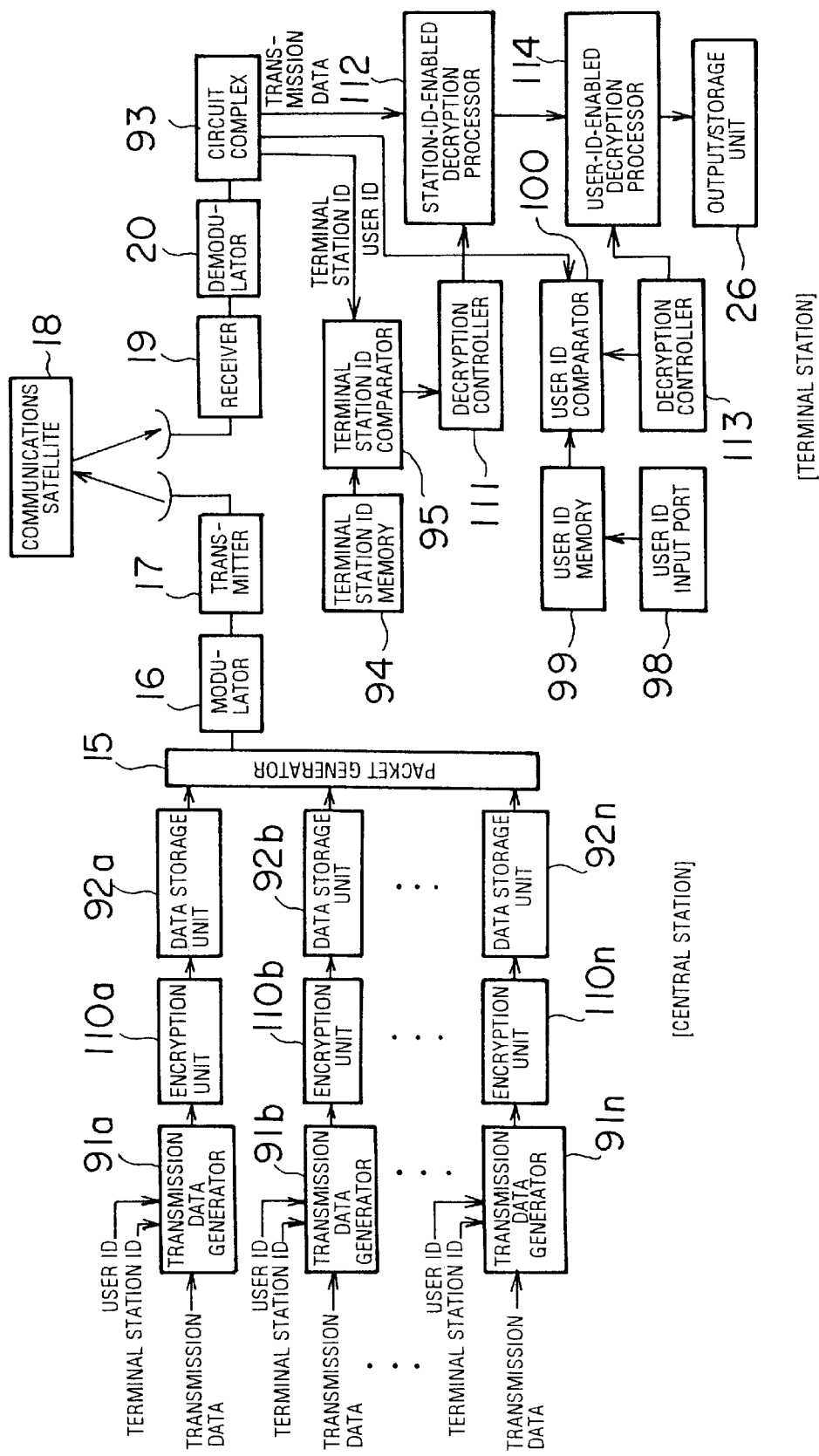
FIG. 25 is a diagram showing the structure of a sixteenth embodiment.

FIG. 25 is a block diagram showing the structure of a sixteenth embodiment. Since this embodiment has basically the same structure as that of the fourteenth embodiment, the following description will focus on its distinctive points, while maintaining the consistent reference numerals for the common elements.

The sixteenth embodiment actually involves some elements in FIG. 5 such as the schedule manager 12, schedule storage unit 13, schedule maker 28, retransmission time slot arranger 29, retransmission schedule maker 30, and vacant time slot finder 31, although they are not shown in FIG. 25.

This embodiment places encryption units 110a–110n next to the transmission data generators 91a–91n in order to apply a data encryption process to the transmission data.

In the terminal station, the terminal station ID and user ID are obtained by partly decrypting the received transmission data and then sent to the terminal station ID comparator 95 and user ID comparator 100, respectively. A decryption controller 111 signals a processing request to a station-ID-enabled decryption processor 112 in response to the permission signal from the terminal station ID comparator 95. On this processing request, the decryption processor 112 decrypts the data received from the circuit complex 93 and outputs the result to a user-ID-enabled decryption processor 114.

Having received the permission signal from the user ID comparator 100, a decryption controller 113 signals a processing request to the user-ID-enabled decryption processor 114, which decrypts the data received from the station-ID-enabled decryption processor 112 and outputs the result to the output/storage unit 26.

In the way described above, the central station can regulate the terminal stations on their reception of transmission data by using the encryption/decryption processes.

The following description will now explain a seventeenth embodiment of the present invention, which allows the central station to specify output ports in the terminal station.

Figure 26:
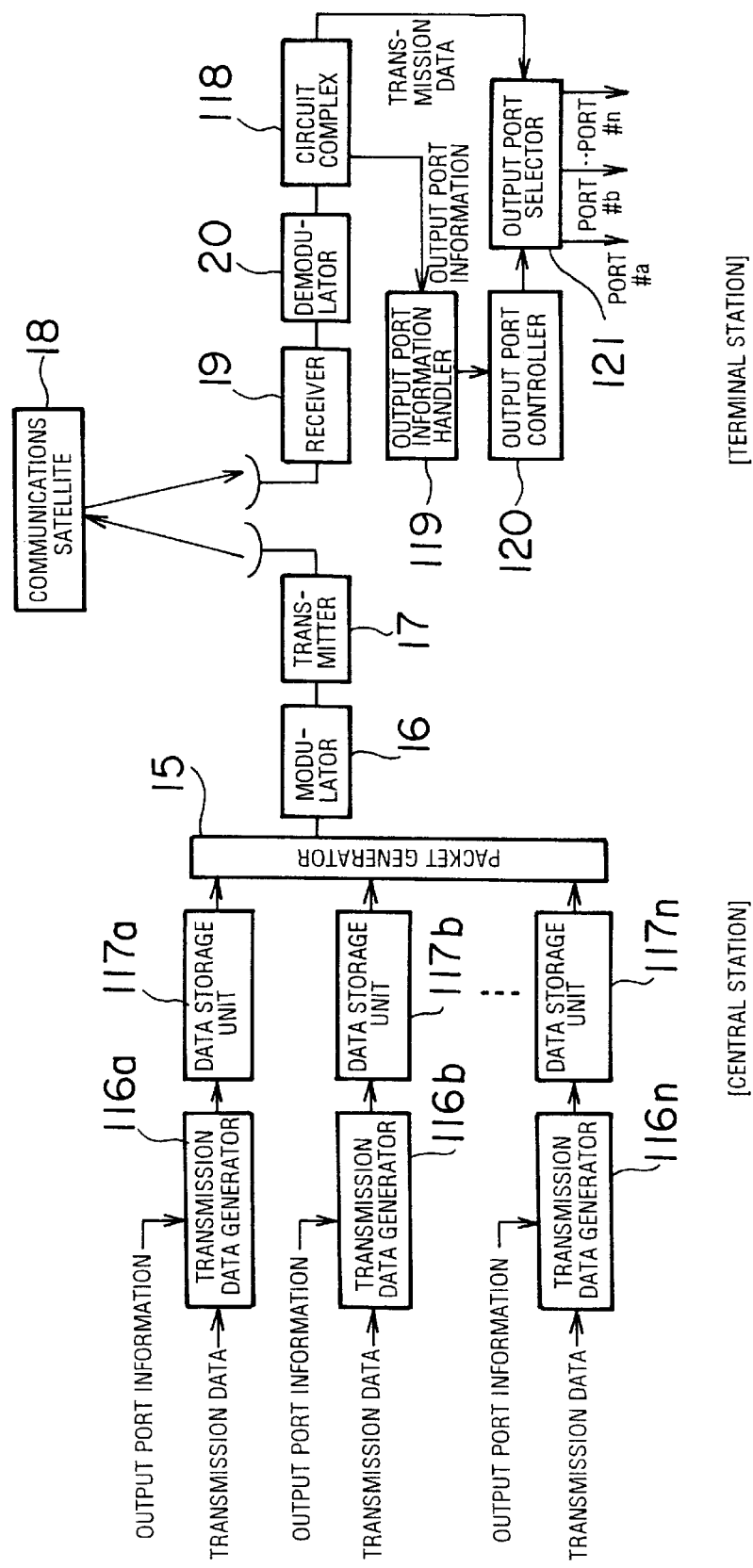
FIG. 26 is a diagram showing the structure of a seventeenth embodiment.

FIG. 26 is a block diagram showing the structure of the seventeenth embodiment. Since this embodiment has basically the same structure as that of the second embodiment, the following description will focus on its distinctive points, while maintaining the consistent reference numerals for the common elements.

Note that the seventeenth embodiment actually involves some elements in FIG. 5 such as the schedule manager 12, schedule storage unit 13, schedule maker 28, retransmission time slot arranger 29, retransmission schedule maker 30, and vacant time slot finder 31, although they are omitted in FIG. 26. Further, a circuit complex 118 in FIG. 26 is equivalent to what are shown in FIG. 5 as: schedule reassembler 22, reservation information handler 24, data reassembler 25, schedule manager 32, and error checker 33. This embodiment, however, does not employs the output/storage unit 26.

The seventeenth embodiment, whose structure is particularly applicable to a transmission of a plurality of messages from a central station, has transmission data generators 116a–116n to attach output port information to each transmission data. This output port information specifies which output port in the terminal station should be used to output the received transmission data to. Data storage units 117a–117n provide the same function as what the data storage unit 11 in FIG. 5 does.

In the terminal station, an output port information handler 119 extracts the output port information attached to the received data and sends it to an output port controller 120. This output port controller 120 directs an output port selector 121 to select an output port as specified by the output port information. The output port selector 121 outputs the data received from the circuit complex 118 (i.e., from the error checker 33 shown in FIG. 5) to the specified output port. Output ports #a, #b, and #n will interface to, for example, a speech output device, a video display device, and a data processing device, respectively.

In the way described above, the information sender (i.e., the central station) can specify the output port suitable for the contents of each transmission data by attaching the output port information thereto.

The following description will now explain an eighteenth embodiment of the present invention, in which the terminal station can selectively receive signals from a specific central station (or a specific information source).

Figure 27:
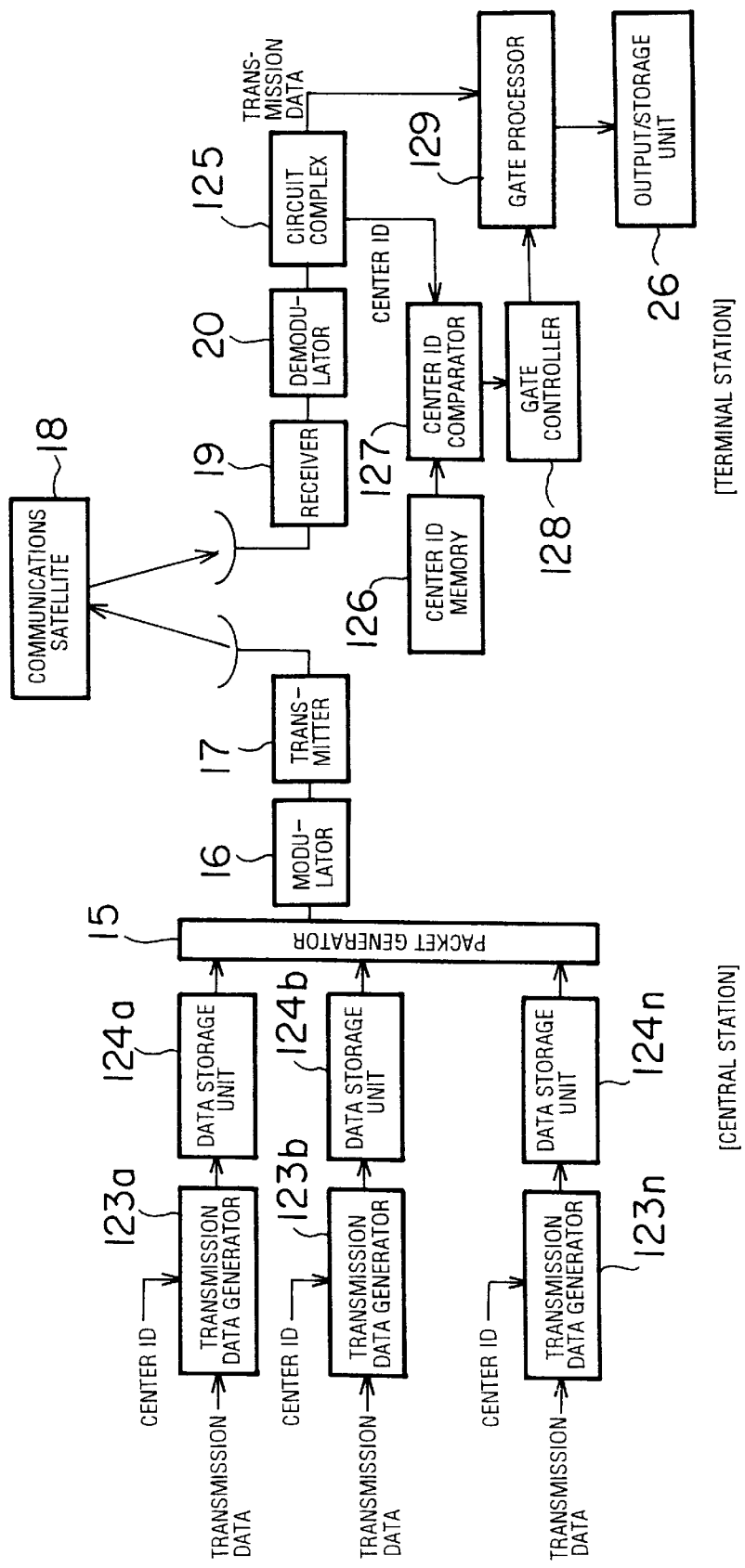
FIG. 27 is a diagram showing the structure of an eighteenth embodiment.

FIG. 27 is a block diagram showing the structure of the eighteenth embodiment. Since this embodiment has basically the same structure as that of the second embodiment, the following description will focus on its distinctive points, while maintaining the consistent reference numerals for the common elements.

Note that the eighteenth embodiment actually employs some elements in FIG. 5 such as the schedule manager 12, schedule storage unit 13, schedule maker 28, retransmission time slot arranger 29, retransmission schedule maker 30, and vacant time slot finder 31, although they are not shown in FIG. 27. Further, a circuit complex 125 in FIG. 27 corresponds to a collection of the schedule reassembler 22, reservation information handler 24, data reassembler 25, schedule manager 32, and error checker 33.

To broadcast a plurality of separate transmission data, the central station in this embodiment employs transmission data generators 123a–123n that attach a center ID to each transmission data. It is assumed here that there are a plurality of central station working on a common transmission system or a plurality of information sources in a single central station. The center ID serves as an identifier to distinguish a particular central station or information source from the others. Data storage units 124a–124n have the same function as that of the data storage unit 11 in FIG. 5.

In the terminal station, a center ID memory 126 holds the ID of a particular central station or specific information source from which the terminal station wishes to receive information. A center ID comparator 127 compares the center ID attached to the received data with the center ID stored in the center ID memory 126, and if they agree, sends a permission signal to a gate controller 128. In response to this permission signal, the gate controller 128 issues a gate opening signal to a gate processor 129. With this gate opening signal, the gate processor 129 transfers the data received from the circuit complex 125 (i.e., from the error checker 33 in FIG. 5) to the output/storage unit 26.

Thanks to the center ID affixed to each transmission data, the terminal station can automatically receive transmission data selectively from a desired central station (or desired information source).

The following description will now explain a nineteenth embodiment of the present invention, which provides another way to allow the terminal station to selectively receive signals from a particular central station (or a particular information source).

Figure 28:
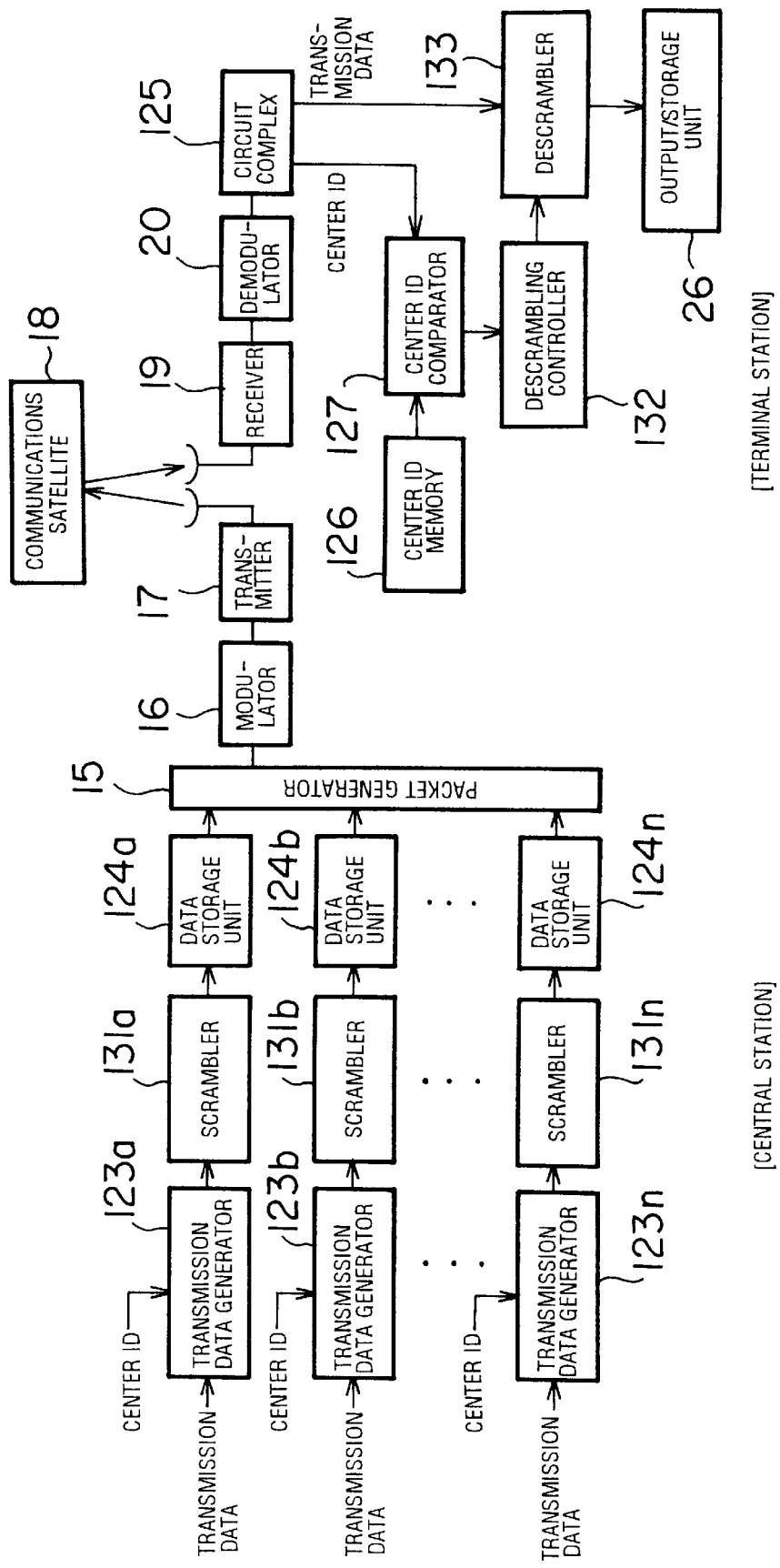
FIG. 28 is a diagram showing the structure of a nineteenth embodiment.

FIG. 28 is a block diagram showing the structure of the nineteenth embodiment. Since this embodiment has basically the same structure as that of the eighteenth embodiment, the following description will focus on its distinctive points, while maintaining the consistent reference numerals for the common elements.

Note that the nineteenth embodiment actually contains some elements in FIG. 5, although they are not shown in FIG. 28, such as the schedule manager 12, schedule storage unit 13, schedule maker 28, retransmission time slot arranger 29, retransmission schedule maker 30, and vacant time slot finder 31.

The central station in the nineteenth embodiment employs scramblers 131a–131n next to the transmission data generators 123a–123n in order to apply a data scrambling process to each transmission data.

In the terminal station, the center ID is obtained by partly descrambling the received transmission data and then sent to the center ID comparator 127. Upon reception of the permission signal from the center ID comparator 127, the a descrambling controller 132 issues a processing request signal to a descrambler 133. With this processing request signal, the descrambler 133 descrambles the data received from the circuit complex 125 and sends the result to the output/storage unit 26.

In the way described above, the data scrambling/descrambling processes are used to enable the terminal station to selectively receive the transmission data from a particular central station or a particular information source.

The following description will now explain a twentieth embodiment of the present invention, which provides still another way to allow the terminal station to selectively receive signals from a desired central station or information source.

Figure 29:
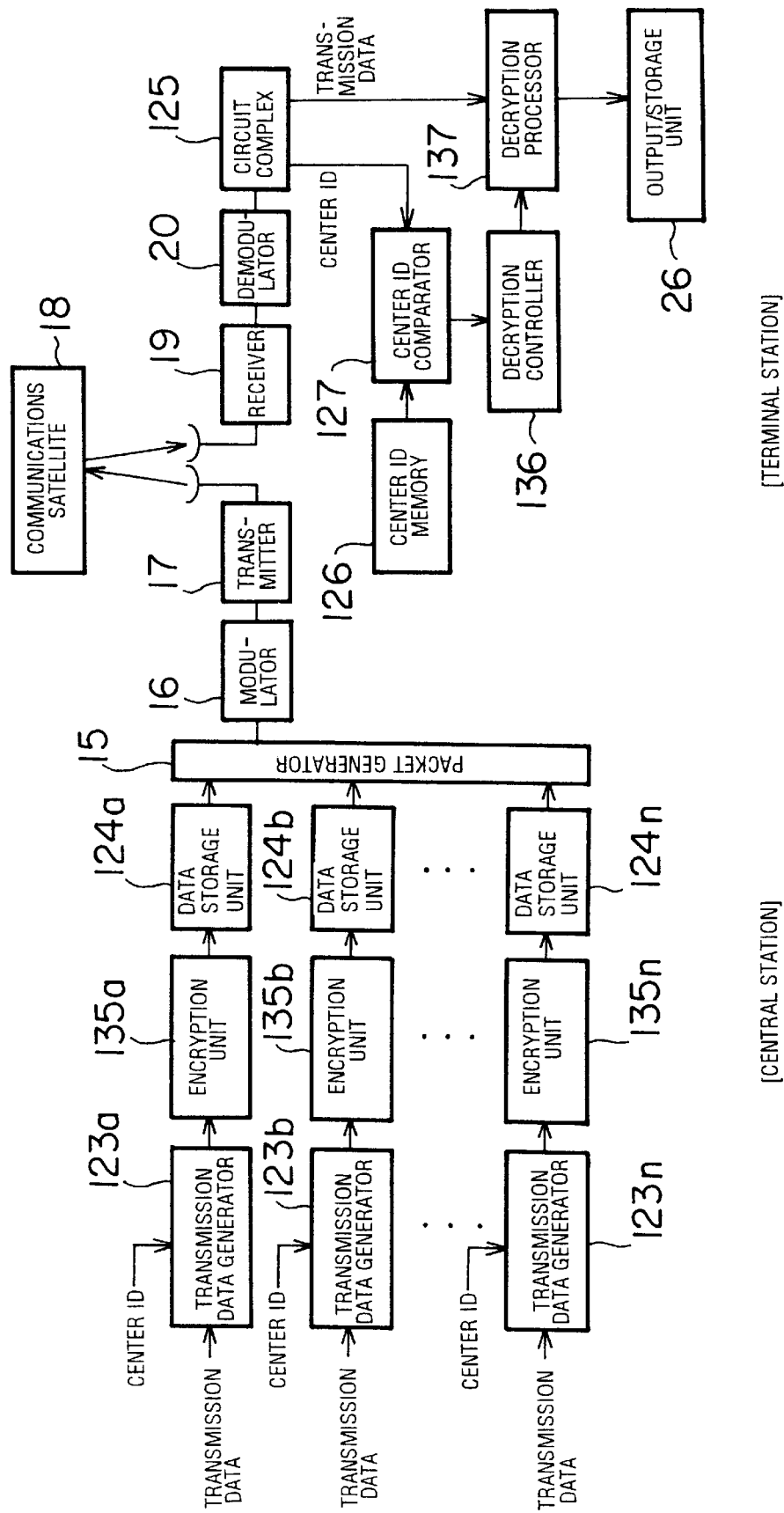
FIG. 29 is a diagram showing the structure of a twentieth embodiment.

FIG. 29 is a block diagram showing the structure of the twentieth embodiment. Since this embodiment has basically the same structure as that of the eighteenth embodiment, the following description will focus on its distinctive points, while maintaining the consistent reference numerals for the common elements.

Note that the twentieth embodiment actually contains some elements in FIG. 5, although they are not shown in FIG. 29, such as the schedule manager 12, schedule storage unit 13, schedule maker 28, retransmission time slot arranger 29, retransmission schedule maker 30, and vacant time slot finder 31.

The central station in the twentieth embodiment employs encryption units 135a–135n next to the transmission data generators 123a–123n in order to encrypt each transmission data.

In the terminal station, the center ID is obtained by partly decrypting the received transmission data and then sent to the center ID comparator 127. Upon reception of the permission signal from the center ID comparator 127, the a decryption controller 136 issues a processing request signal to a decryption processor 137. With this processing request signal, the decryption processor 137 decrypts the data received from the circuit complex 125 and sends the result to the output/storage unit 26.

In the way described above, the data encryption/decryption processes are used to enable the terminal station to selectively receive the transmission data from a desired central station or information source.

The following description will now explain a twenty-first embodiment of the present invention, which allows the central station to regulate the terminal stations on their reception of transmission data.

Figure 30:
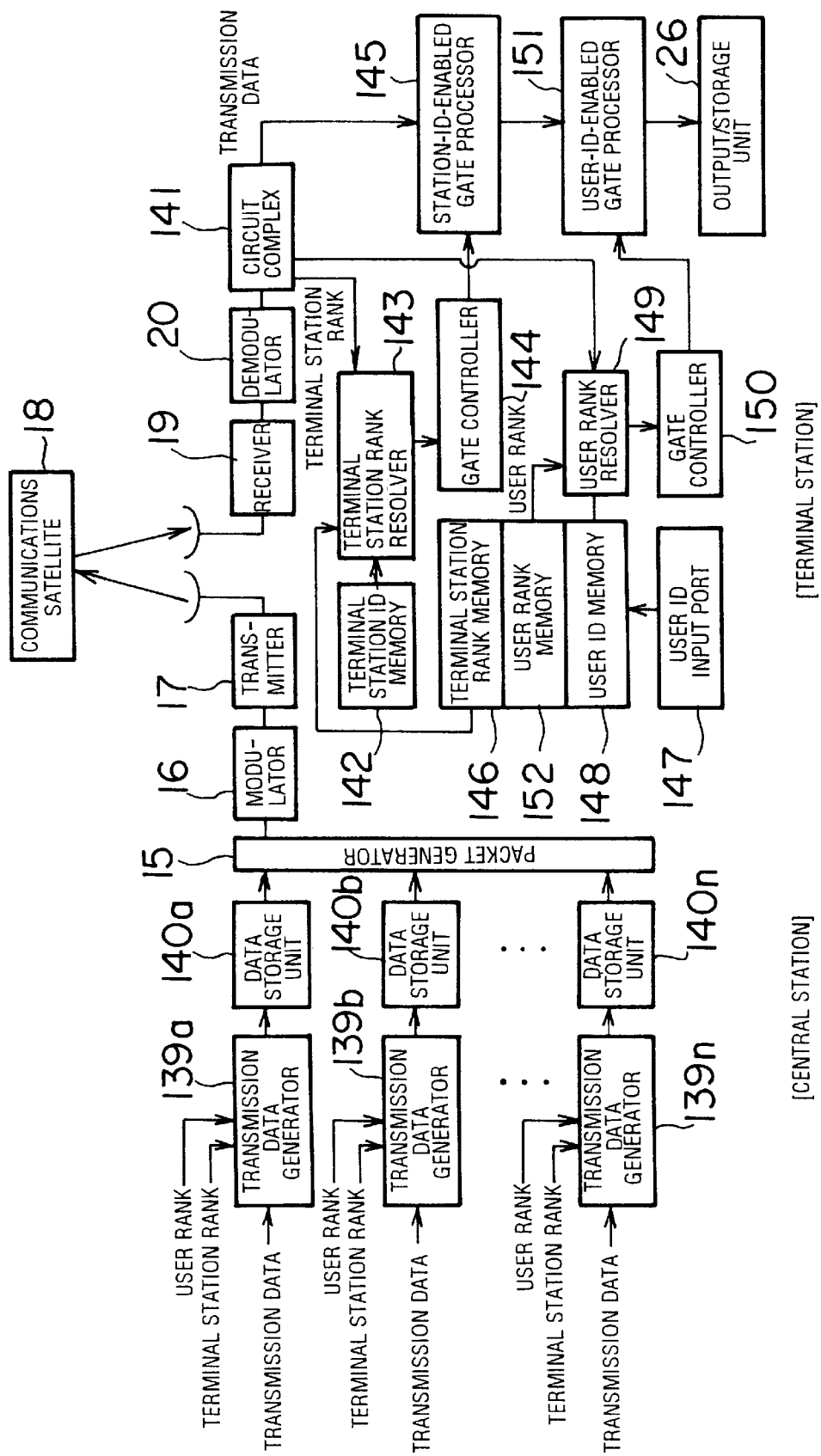
FIG. 30 is a diagram showing the structure of a twenty-first embodiment.

FIG. 30 is a block diagram showing the structure of the twenty-first embodiment. Since this embodiment has basically the same structure as that of the second embodiment, the following description will focus on its distinctive points, while maintaining the consistent reference numerals for the common elements.

Note that the twenty-first embodiment actually involves some elements in FIG. 5, although they are not shown in FIG. 30, such as the schedule manager 12, schedule storage unit 13, schedule maker 28, retransmission time slot arranger 29, retransmission schedule maker 30, and vacant time slot finder 31. Further, a circuit complex 141 in FIG. 30 actually is a collection of the schedule reassembler 22, reservation information handler 24, data reassembler 25, schedule manager 32, and error checker 33 shown in FIG. 5.

The twenty-first embodiment specifically presents a system configuration for sending data to a plurality of terminal stations. Transmission data generators 139a–139n affix a user rank and a terminal station rank to each data to be transmitted. The user rank or terminal station rank is information to indicate a particular user's or particular terminal station's rank by which the security of transmission data is controlled. For example, while only rank-A users can make access to transmission data that is graded at the top secret, less confidential data of the next grade is accessible to rank-B users as well as to the rank-A users. Data storage units 140a–140n have the same function as that of the data storage unit 11 in FIG. 5.

The terminal station stores its own ID in a terminal station ID memory 142 and a terminal station rank table in a terminal station rank memory 146. Evaluating the terminal station ID affixed to the received data with reference to its own ID and the rank table, a terminal station rank resolver 143 decides whether it is permitted or not to receive the transmission data. Only when it is found permitted, the terminal station rank resolver 143 sends a permission signal to a gate controller 144. Responding to this permission signal, the gate controller 144 sends a gate opening signal to a station-ID-enabled gate processor 145. According to this signal, the station-ID-enabled gate processor 145 forwards the received data from a circuit complex 141 (i.e., from the error checker 33 in FIG. 5) to a user-ID-enabled gate processor 151.

Meanwhile, a user ID is entered from an external source to a user ID memory 148 via a user ID input port 147, and a user rank table is stored in a user rank memory 152. Evaluating the user ID attached to the received data with reference to the stored user ID and user rank table, a user rank resolver 149 decides whether it is permitted or not to receive the transmission data. Only when it is found permitted, the user rank resolver 149 sends a permission signal to a gate controller 150. In response to this permission signal, the gate controller 150 sends a gate opening signal to a user-ID-enabled gate processor 151. According to the gate opening signal, the user-ID-enabled gate processor 151 transfers the message data from the station-ID-enabled gate processor 145 to the output/storage unit 26.

In the way described above the system can be configured so that the transmission data will reach only limited groups of users and terminal stations by attaching a user rank and a terminal station rank to each transmission data.

The following description will now explain a twenty-second embodiment of the present invention, which provides another way to allow the central station to regulate the terminal station on their reception of transmission data.

Figure 31:
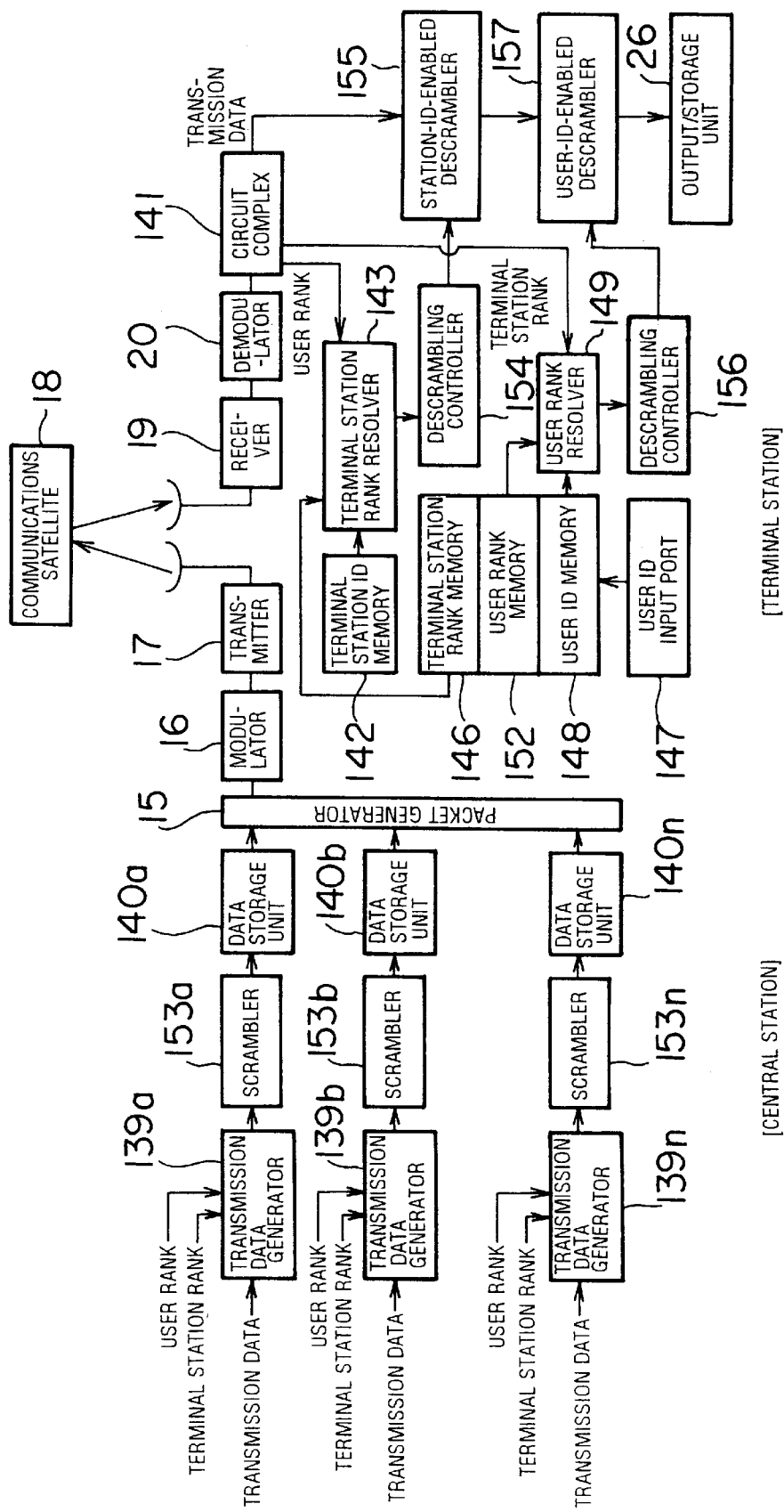
FIG. 31 is a diagram showing the structure of a twenty-second embodiment.

FIG. 31 is a block diagram showing the structure of the twenty-second embodiment. Since this embodiment has basically the same structure as that of the twenty-first embodiment, the following description will focus on its distinctive points, while maintaining the consistent reference numerals for the common elements.

Note that the twenty-second embodiment actually involves some elements in FIG. 5, although they are not shown in FIG. 31, such as the schedule manager 12, schedule storage unit 13, schedule maker 28, retransmission time slot arranger 29, retransmission schedule maker 30, and vacant time slot finder 31.

The central station in the twenty-second embodiment employs scramblers 153a–153n next to the transmission data generators 139a–139n in order to apply a scrambling process to each transmission data.

In the terminal station, the terminal station rank and user rank are obtained by partly descrambling the received transmission data and then sent to the terminal station rank resolver 143 and user rank resolver 149, respectively. Upon reception of the permission signal from the terminal station rank resolver 143, a descrambling controller 154 issues a processing request signal to a station-ID-enabled descrambler 155. With this processing request signal, the station-ID-enabled descrambler 155 descrambles the data received from the circuit complex 141 and supplies its output to a user-ID-enabled descrambler 157.

Upon reception of the permission signal from the user rank resolver 149, a descrambling controller 156 sends a processing request signal to a user-ID-enabled descrambler 157. According to this request signal, the user-ID-enabled descrambler 157 descrambles the message data from the station-ID-enabled descrambler 155 and transfers the result to the output/storage unit 26.

In the way described above the system can be configured so that the transmission data will reach only a limited group of users or terminal stations using data scrambling/descrambling processes.

The following description will now explain a twenty-third embodiment of the present invention, which provides still another way to allow the central station to regulate the reception of transmission data by each terminal station.

Figure 32:
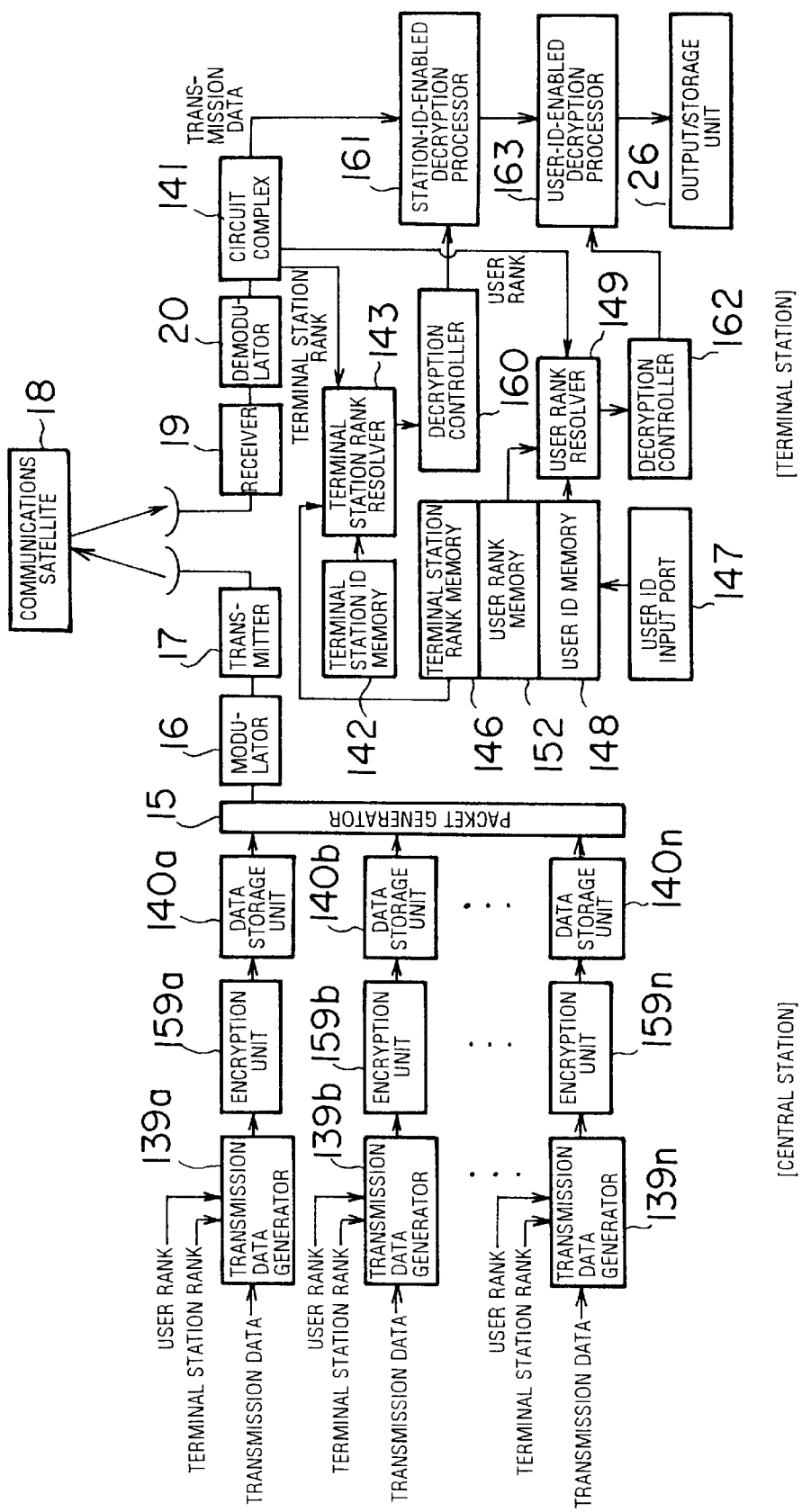
FIG. 32 is a diagram showing the structure of a twenty-third embodiment.
Figure 33:
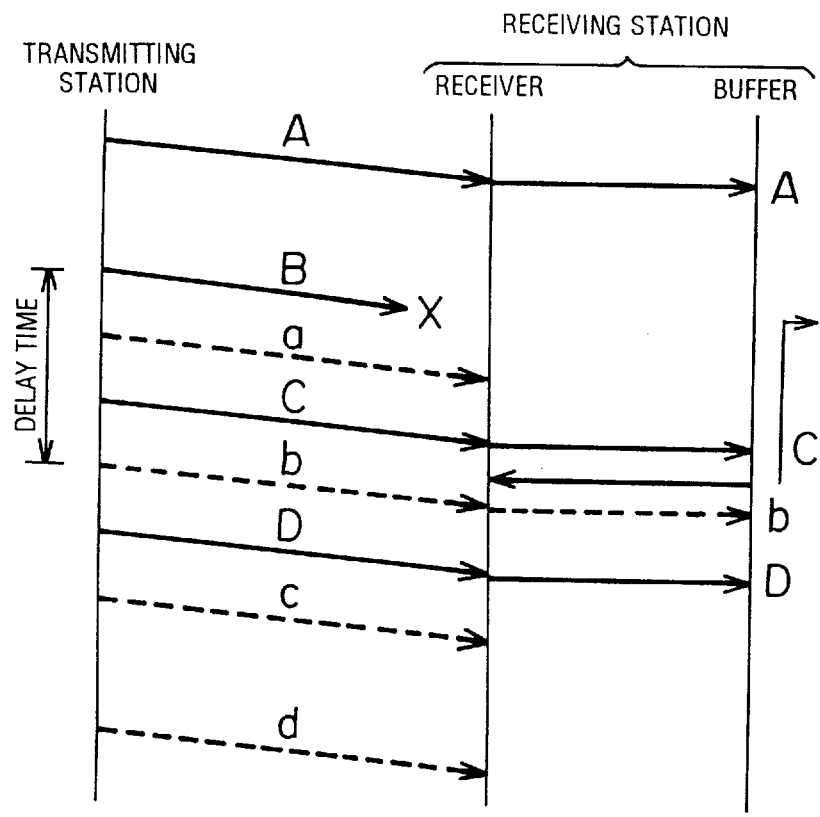
FIG. 33 is a diagram showing a conventional data transfer sequence.

FIG. 32 is a block diagram showing the structure of the twenty-third embodiment. Since this embodiment has basically the same structure as that of the twenty-first embodiment, the following description will focus on its distinctive points, while maintaining the consistent reference numerals for the common elements.

Note that the twenty-third embodiment actually contains some elements in FIG. 5, although they are not shown in FIG. 32, such as the schedule manager 12, schedule storage unit 13, schedule maker 28, retransmission time slot arranger 29, retransmission schedule maker 30, and vacant time slot finder 31.

The central station in the twenty-third embodiment places encryption units 159a–159n next to the transmission data generators 139a–139n in order to apply an encryption process to each transmission data.

In the terminal station, the terminal station rank and user rank are obtained by partly decrypting the received transmission data and then sent to the terminal station rank resolver 143 and user rank resolver 149, respectively. Upon reception of the permission signal from the terminal station rank resolver 143, the a decryption controller 160 issues a processing request signal to a station-ID-enabled decryption processor 161. With this processing request signal, the station-ID-enabled decryption processor 161 decrypts the data received from the circuit complex 141 and supplies the result to a user-ID-enabled decryption processor 163.

Upon reception of the permission signal from the user rank resolver 149, a decryption controller 162 sends a processing request signal to the user-ID-enabled decryption processor 163. According to this request signal, the user-ID-enabled decryption processor 163 decrypts the message data from the station-ID-enabled decryption processor 161 and transfers the result to the output/storage unit 26.

In the way described above the system can be configured so that the transmission data will reach only a limited group of users or terminal stations using data encryption/decryption processes.

The above discussion will be summarized as follows. According to the present invention, the host station transmits the broadcast schedule, which at least contains the title and transmission time of each transmission data, to every terminal station via the communications satellite. Using the received broadcast schedule, each terminal station receives its desired information at the scheduled transmission time selectively from the various data that have been transmitted on the link. In addition, the host station searches the broadcast schedule for vacant time slots in which no transmission is assigned and rearranges the broadcast schedule so that the data retransmission be made during those vacant time slots.

Thus the receiving terminal stations can obtain their desired information including the retransmission data in an efficient way based on the broadcast schedule, thereby improving the efficiency of data retransmission operations without sacrificing the channel capacity of the satellite communications link.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A satellite broadcast communication system in which a host station sends data packet signals to a plurality of terminal stations via a communications satellite comprising:

broadcast schedule transmission means, disposed in the host station, for transmitting a broadcast schedule that defines titles and transmission times for a plurality of transmission data;

composite information transmission means, disposed in the host station, for transmitting the plurality of transmission data in form of data packets at the respective transmission times according to said broadcast schedule;

broadcast schedule reception means disposed in each of the terminal stations, for receiving said broadcast schedule;

desired information reception means, disposed in each of the terminal stations, for receiving desired transmission data at a particular scheduled transmission time described in the broadcast schedule received by said broadcast schedule reception means, selectively from the plurality of transmission data sent form said composite information transmission means in the form of data packets;

vacant time slot detection means, disposed in the host station, for searching said broadcast schedule and thereby detecting vacant time slots during which no data transmission is scheduled;

broadcast schedule generation means, disposed in the host station, for rearranging said broadcast schedule so that said detected vacant time slots are used to send retransmission data duplicating the transmission data once transmitted by said composite information transmission means; and wherein said broadcast schedule transmission means transmits said broadcast schedule rearranged by said broadcast schedule generation means to said broadcast schedule reception means in the respective terminal stations, and said composite information transmission means transmits the retransmission data to said broadcast schedule reception means in addition to the plurality of transmission data according to said broadcast schedule rearranged by said broadcast schedule generation means.

2. A satellite broadcast communications system according to claim 1, wherein said broadcast schedule generation means comprises broadcast schedule updating means for selecting one of said detected vacant time slots according to sizes of the retransmission data and rearranging said broadcast schedule so that the retransmission data be sent in the selected vacant time slot.

3. A satellite broadcast communications system according to claim 1, wherein said broadcast schedule generation means comprises broadcast schedule updating means for selecting one of the detected vacant time slots according to rainfall duration data and rearranging said broadcast schedule so that the retransmission data be sent in the selected vacant time slot.

4. A satellite broadcast communications system according to claim 1, wherein said broadcast schedule further predefines reserved time slots dedicated for sending the retransmission data, and said vacant time slot detection means outputs said reserved time slots as the vacant time slots where no data transmission is scheduled.

5. A satellite broadcast communications system according to claim 1, wherein said composite information transmission means comprises differential data transmission means for computing differential data that only contains difference between new transmission data to be sent and previous transmission data that has been sent and transmitting said differential data in the data packets, and said desired information reception means comprises data restoration means for restoring the new transmission data to an original form thereof using said differential data received from said differential data transmission means.

6. A satellite broadcast communications system according to claim 5, wherein said broadcast schedule further predefines reserved time slots, broadcast schedule generation means comprises broadcast schedule updating means for rearranging the broadcast schedule so that said reserved time slots be used to transmit new transmission data as a whole, and said composite information transmission means transmits said new transmission data as a whole according to said broadcast schedule rearranged by said broadcast schedule updating means.

7. A satellite broadcast communications system according to claim 5, further comprising:

a particular packet area provided in a transmission frame; and particular packet area transmission means, disposed in the host station, for transmitting the retransmission data using said particular packet area and transmitting said differential data using said packet area when there is no retransmission data ready to be transmitted in said particular packet area.

8. A satellite broadcast communications system according to claim 7, wherein said particular packet area transmission means comprises separate frequency transmission means for transmitting said particular packet area using a separate frequency that is different from a frequency used in transmitting said differential data, and the satellite broadcast communications system further comprises separate frequency reception means disposed in each of the terminal stations for receiving said particular packet area transmitted with said separate frequency.

9. A satellite broadcast communications system according to claim 5, further comprising:

compressed data transmission means, disposed in the host station, for transmitting said new transmission data in a compressed form; and data expansion means, disposed in each of the terminal stations, for receiving and expanding said new transmission data sent in the compressed form by said compressed data transmission means.

10. A satellite broadcast communications system according to claim 1, wherein said composite information transmission means comprises:

searching means for searching for an unused portion in a transmission data field of each packet; and retransmission data transmission means for packing the retransmission data into said unused portion found by said searching means and transmitting the packet to said desired information reception means in the respective terminal stations.

11. A satellite broadcast communications system according to claim 1, further comprising:

retransmission requesting means, disposed in each of the terminal stations, for detecting an error in received transmission data and issuing a request to the host station for retransmitting the transmission data when the error has been detected; and retransmission request processing means, disposed in the host station, for directing said broadcast schedule generation means, upon reception of said request for retransmission, to rearrange said broadcast schedule so that the transmission data be retransmitted.

12. A satellite broadcast communications system according to claim 1, further comprising:

error status transmission means, disposed in each of the terminal stations, for performing an error detection for received transmission data and transmitting an error status to the host station when any error is detected as a result of said error detection; and retransmission request processing means, disposed in the host station, for (a) receiving said error status from one terminal station, (b) examining whether any other terminal station has reported the error or not regarding the same transmission data, and (c) directing said broadcast schedule generation means to rearrange said broadcast schedule so as to retransmit the transmission data, if a predetermined number of or more terminal stations has reported the error.

13. A satellite broadcast communications system according to claim 1, further comprising power control means, disposed in each of the terminal stations, for controlling a supply power for the terminal station according to the received broadcast schedule so that the terminal station is turned on at a transmission start time and turned off at a transmission end time of the desired transmission data.

14. A satellite broadcast communications system according to claim 1, wherein said composite information transmission means comprises identifier affixing means for affixing a terminal station identifier to identify a particular terminal station or a user identifier to identify a particular user to each of the transmission data before transmission, and said desired information reception means comprises output control means for extracting the terminal station identifier or the user identifier affixed to the received desired transmission data, and outputting the received desired transmission data if said extracted terminal station identifier or said extracted user identifier agrees with a preset terminal station identifier or a preset user identifier, respectively.

15. A satellite broadcast communications system according to claim 1, wherein said composite information transmission means comprises identifier affixing means for affixing an output port information to specify an output port in the terminal station to each of the transmission data before transmission, and said desired information reception means comprises output control means for extracting said output port information affixed to the received desired transmission data and outputting the received desired transmission data to the output port specified by said output port information.

16. A satellite broadcast communications system according to claim 1, wherein said composite information transmission means comprises identifier affixing means for affixing a host station identifier to identify the host station to each of the transmission data before transmission, and said desired information reception means comprises output control means for extracting said host station identifier affixed to the received desired transmission data, and outputting the received desired transmission data if said extracted host station identifier agrees with a preset host station identifier.

17. A satellite broadcast communications system according to claim 1, wherein said composite information transmission means comprises identifier affixing means for affixing a terminal station rank identifier to identify a rank of the terminal stations or a user rank identifier to identify a rank of users to each of the transmission data before transmission, and said desired information reception means comprises output control means for extracting said terminal station rank identifier or said user rank identifier affixed to the received desired transmission data and outputting the received desired transmission data if a preset terminal station rank or a preset user rank includes a rank implied by the extracted terminal station rank identifier or said extracted user rank identifier, respectively.

18. A satellite broadcast communications system in which a host station sends data packet signals to a plurality of terminal stations via a communications satellite, comprising:

broadcast schedule formulating means, disposed in the host station, for formulating a broadcast schedule that defines titles and transmission times of a plurality of transmission data, and further rearranging the broadcast schedule so as to include data retransmission in vacant time slots during which no data transmission is scheduled;

broadcast schedule transmission means, disposed in the host station, for transmitting the broadcast schedule formulated by said broadcast schedule formulating means;

composite information transmission means, disposed in the host station, for transmitting the plurality of transmission data in form of data packets at the respective transmission times according to said broadcast schedule;

broadcast schedule reception means, disposed in each of the terminal stations, for receiving said broadcast schedule; and desired information reception means, disposed in each of the terminal stations, for receiving desired transmission data at a particular scheduled transmission time described in the broadcast schedule received by said broadcast schedule reception means, selectively from the plurality of transmission data sent from said composite information transmission means in the form of data packets.

* * * * *